United States Patent
Zeira

(10) Patent No.: US 12,503,616 B2
(45) Date of Patent: Dec. 23, 2025

(54) APPARATUS, METHOD AND ARTICLE OF MANUFACTURE FOR PRODUCING AN EDIBLE MULTI-COLOR INK-IMAGE

(71) Applicant: RIPPLES LTD, Petah Tikva (IL)

(72) Inventor: Assaf Zeira

(73) Assignee: RIPPLES LTD., Petah Tikva (IL)

( * ) Notice: Subject to any disclaimer, the term of this patent is extended or adjusted under 35 U.S.C. 154(b) by 441 days.

(21) Appl. No.: 17/924,221

(22) PCT Filed: May 16, 2021

(86) PCT No.: PCT/IB2021/054189
§ 371 (c)(1),
(2) Date: Nov. 9, 2022

(87) PCT Pub. No.: WO2021/234528
PCT Pub. Date: Nov. 25, 2021

(65) Prior Publication Data
US 2023/0225372 A1    Jul. 20, 2023

Related U.S. Application Data

(60) Provisional application No. 63/026,038, filed on May 16, 2020.

(51) Int. Cl.
*C09D 11/32* (2014.01)
*A23G 3/34* (2006.01)
(Continued)

(52) U.S. Cl.
CPC ............ *C09D 11/32* (2013.01); *A23G 3/0089* (2013.01); *A23L 2/58* (2013.01); *A23L 5/43* (2016.08);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,800,601 A * 9/1998 Zou .................... C09D 11/36
                                                    106/31.74
7,166,154 B2   1/2007 Barreto
(Continued)

FOREIGN PATENT DOCUMENTS

CA        3128912 A1    11/2020
CN        209431215 U    9/2019
(Continued)

OTHER PUBLICATIONS

Colorant alimentaire en poudre rose fluo 3g—ScrapCooking [May 18, 2018].
(Continued)

*Primary Examiner* — Manish S Shah
(74) *Attorney, Agent, or Firm* — Momentum IP; Marc Van Dyke

(57) ABSTRACT

Embodiments of the invention relate to an apparatus, method and article of manufacturing for producing an edible multi-color ink image. In some embodiments, first and second fluids are provided where: i. the first fluid is an acidic edible and aqueous ink whose color is pH sensitive, the first fluid comprising anthocyanin-containing extract of anthocyanin-containing plant matter (ACE-ACPM), or solids of the ACE-ACPM; ii. the second fluid is an edible pH-adjusting liquid which is clear, or whose primary colorant is riboflavin or riboflavin-phosphate.

20 Claims, 37 Drawing Sheets

(51) Int. Cl.
| | | |
|---|---|---|
| *A23L 2/58* | (2006.01) | |
| *A23L 5/43* | (2016.01) | |
| *A23L 5/44* | (2016.01) | |
| *A23P 20/10* | (2016.01) | |
| *B41J 2/01* | (2006.01) | |
| *B41J 2/21* | (2006.01) | |
| *B41J 3/407* | (2006.01) | |
| *B41M 5/00* | (2006.01) | |
| *C09B 67/22* | (2006.01) | |
| *C09B 67/44* | (2006.01) | |
| *C09D 11/30* | (2014.01) | |
| *C09D 11/38* | (2014.01) | |
| *C09D 11/50* | (2014.01) | |
| *A23P 20/25* | (2016.01) | |

(52) U.S. Cl.
CPC ............... *A23L 5/44* (2016.08); *A23P 20/10* (2016.08); *B41J 2/01* (2013.01); *B41J 2/2107* (2013.01); *B41J 3/407* (2013.01); *B41M 5/0047* (2013.01); *C09B 67/0033* (2013.01); *C09B 67/0083* (2013.01); *C09D 11/30* (2013.01); *C09D 11/50* (2013.01); *A23P 2020/253* (2016.08); *B41M 5/0064* (2013.01); *B41M 5/0076* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41J 3/407; B41M 5/0011; B41M 5/0017; B41M 5/0023; B41M 5/0047; B41M 7/00; B41M 7/0072; B41M 5/52; B41M 5/5218; B41M 5/5227; B41M 5/0064; B41M 5/0076; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/50; A23G 3/0089; A23L 2/58; A23L 5/43; A23L 5/44; A23P 20/10; A23P 2020/253; C09B 67/0033; C09B 67/0083

See application file for complete search history.

(56) References Cited

U.S. PATENT DOCUMENTS

| | | |
|---|---|---|
| 2004/0121050 A1 | 6/2004 | Thurman |
| 2005/0003055 A1 | 1/2005 | Baydo |
| 2005/0061184 A1 | 3/2005 | Russell |
| 2005/0099475 A1 | 5/2005 | Barreto |
| 2006/0038866 A1* | 2/2006 | Wen ................. C09D 11/30 106/31.89 |
| 2006/0222702 A1 | 10/2006 | Barreto |
| 2007/0048407 A1 | 3/2007 | Collins |
| 2007/0222830 A1* | 9/2007 | Moynihan .............. B41J 2/2107 347/85 |
| 2008/0032011 A1* | 2/2008 | Liniger .................. A23L 5/42 426/302 |
| 2009/0317519 A1 | 12/2009 | Lavie |
| 2015/0147444 A1 | 5/2015 | Eliav |
| 2015/0251470 A1 | 9/2015 | Lavie |
| 2016/0021907 A1 | 1/2016 | Cavin |
| 2017/0066252 A1 | 3/2017 | Eliav |
| 2019/0200799 A1 | 7/2019 | Meshulam |
| 2021/0106164 A1 | 4/2021 | Lavie |
| 2021/0153684 A1 | 5/2021 | Meshulam |
| 2021/0259455 A1 | 8/2021 | Meshulam |
| 2021/0395547 A1 | 12/2021 | Zeira |
| 2023/0157480 A1 | 5/2023 | Zeira |
| 2023/0183504 A1 | 6/2023 | Zeira |

FOREIGN PATENT DOCUMENTS

| | | | |
|---|---|---|---|
| CN | 110122813 B | 12/2021 | |
| JP | 2004051650 A | 2/2004 | |
| JP | 2011241312 A | 12/2011 | |
| JP | 5488793 B2 | 5/2014 | |
| JP | 2018203934 A | 12/2018 | |
| WO | WO-2010118289 A1 * | 10/2010 | ........... A23G 3/0097 |
| WO | 2017/221077 A2 | 12/2017 | |
| WO | 2020/084328 A1 | 4/2020 | |
| WO | 2020/233101 A1 | 11/2020 | |

OTHER PUBLICATIONS

International Search Report for PCT/IB2021/000327 mailed Oct. 7, 2021.
International Search Report for PCT/IB2021/054189 mailed Sep. 1, 2021.
Written Opinion for PCT/IB2021/000327 mailed Sep. 1, 2021.
Written Opinion for PCT/IB2021/054189 mailed Sep. 1, 2021.

* cited by examiner

Binary Digital Image

*Prior Art*

Fig. 1A

First Digital Image
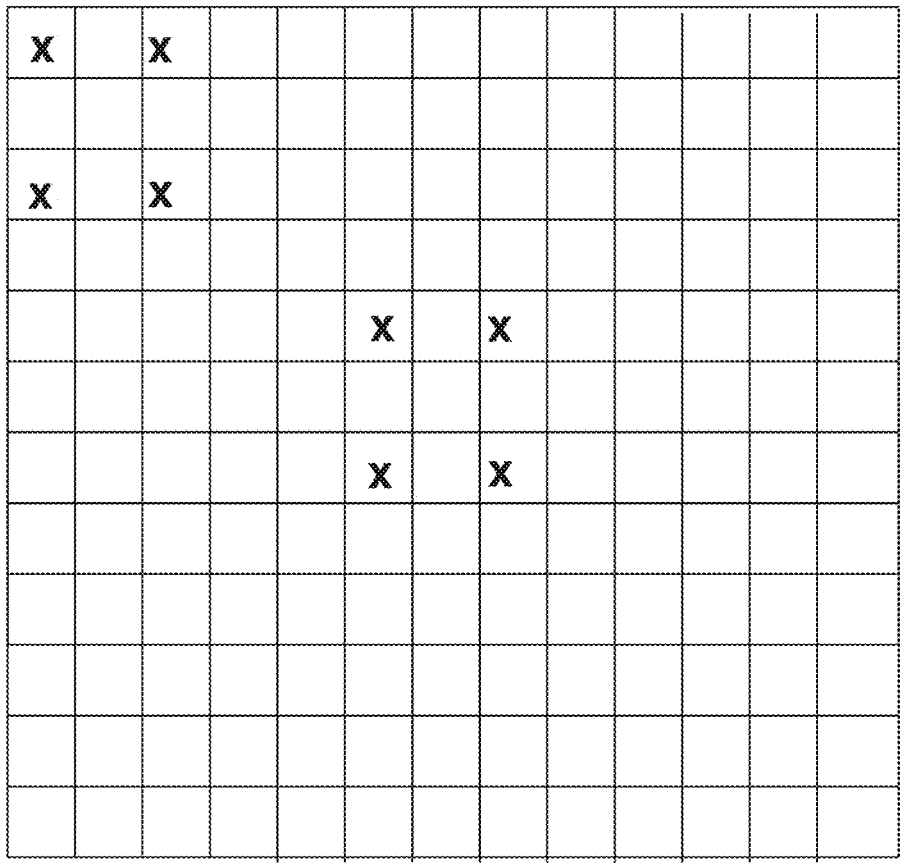
*Prior Art*
To be printed using
A first ink having
a first color
 First Color
(primary color)
*First Multi-Color*
*Prior Art Example*
Fig. 2

Second Digital Image
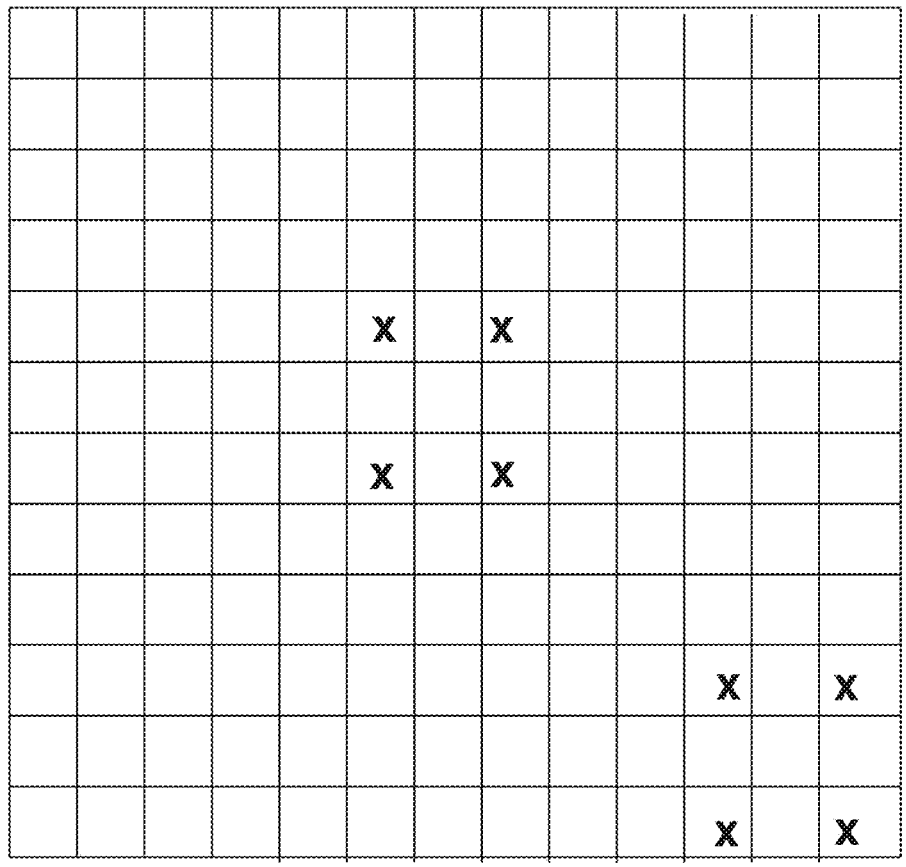
*Prior Art*
To be printed using
A second ink having
a second color
 Second Color
(primary color)
*First Multi-Color
Prior Art Example*
Fig. 3

PARTIALLY PRINTED Multi-Color Ink Image
(individual DOT view – under magnification)

*Prior Art*

PARTIALLY PRINTED →
After first pass (first color) and
before second pass
(intermediate state – single-color)

*First Multi-Color*
*Prior Art Example*

FULLY PRINTED Multi-Color Ink Image
(individual DOT view – under magnification)
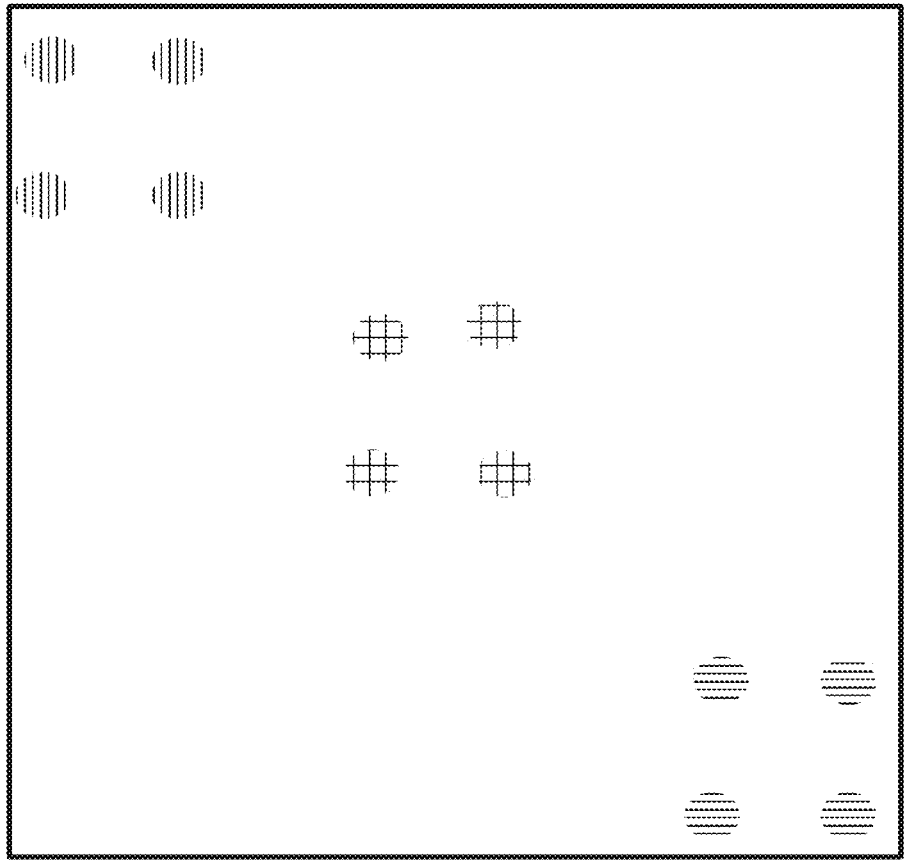
*Prior Art*
*First Multi-Color Prior Art Example*
FULLY PRINTED →
After first pass (first color) and
after second pass (second color)
 First Color (primary color)
 Second Color (primary color)
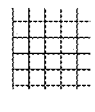 Third Color (secondary color) Produced By dot and/or droplet overlay
Fig. 4B

Multi-Color Ink Image – no magnification

*Prior Art*

*First Multi-Color Prior Art Example*

Second Example of Fully printed Multi-Color Ink Image (individual DOT view – under magnification)
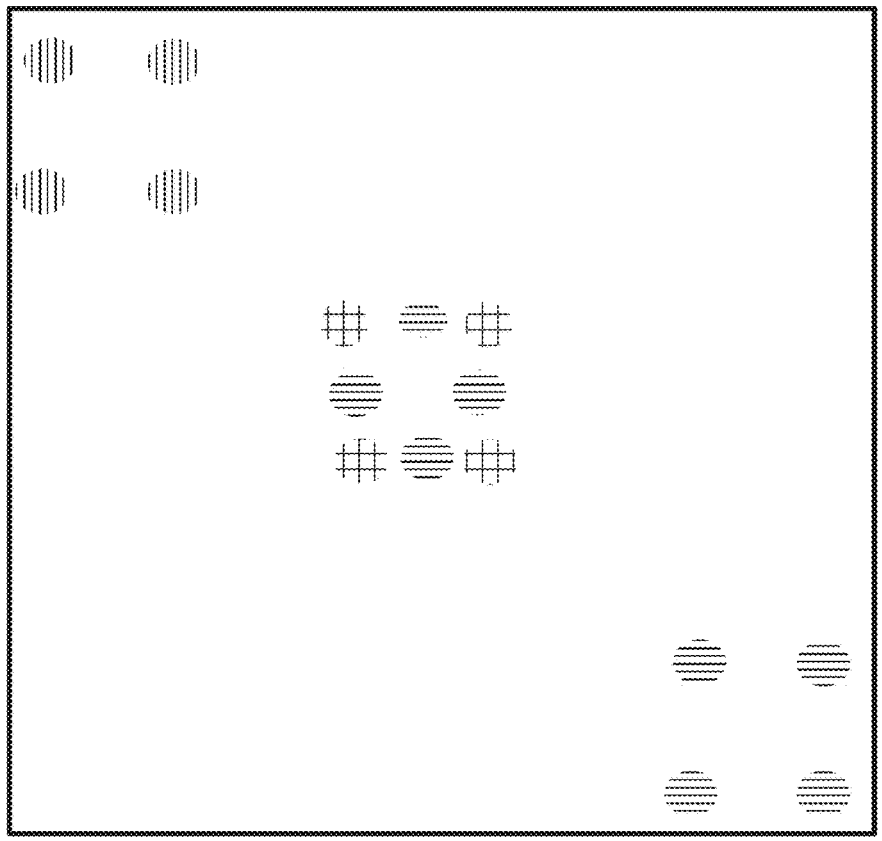
*Prior Art*
*Second Multi-Color Prior Art Example*
 First Color (primary color)
 Second Color (primary color)
 Third Color (secondary color) Produced By dot and/or droplet overlay
Fig. 6A

Second Example of *Fully printed* Multi-Color Ink image – NO magnification
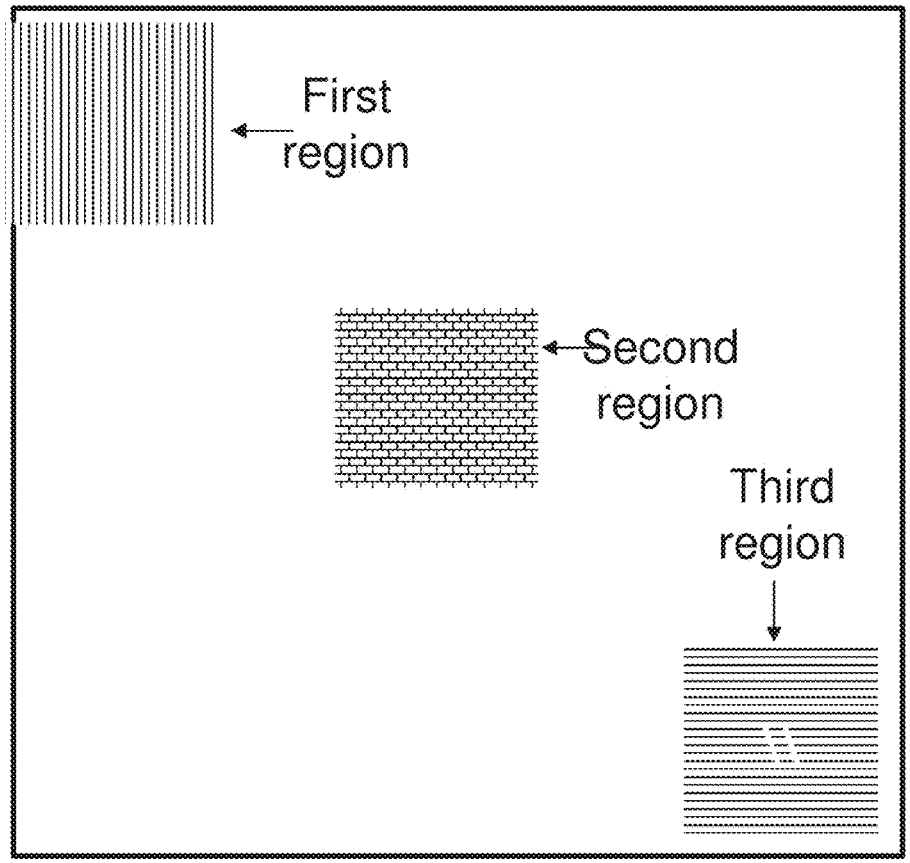
*Prior Art*
*Second Multi-Color Prior Art Example*
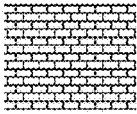 = Fourth Color
(i.e. optical blend
Between second and third color)
Fig. 6B

Prior Art

Prior Art

| Color name | Position on 12-Color Color-Wheel | RGB value |
|---|---|---|
| Yellow-green | 1 | 184, 212, 50 |
| Green | 2 | 61, 181, 75 |
| Blue-green | 3 | 0, 154, 144 |
| Blue | 4 | 52, 1, 204 |
| Blue-violet | 5 | 46, 44, 117 |
| Violet | 6 | 104, 57, 127 |
| Red-violet | 7 | 194, 0, 114 |
| Red | 8 | 248, 1, 32 |
| Red-orange | 9 | 239, 93, 34 |
| Orange | 10 | 254, 153, 0 |
| Yellow-orange | 11 | 255, 204, 0 |
| Yellow | 12 | 254, 242, 0 |

Fig. 7B

First fluid 218 (colored) -

Ink-jettable red edible acidic aqueous ink wherein
anthocyanin-containing plant juice (e.g. filtered) or a
Concentrate thereofor solids thereof
is a primary colorant of the ink
(e.g. having viscosity of at least 2.5 cP)

Second fluid 220 (clear) -

Ink-jettable clear edible base aqueous fluid
(e.g. Having viscosity of at least 2.5 cP)
(e.g. pH between 7.4 and 10)

pH:Mixing-ratio dependency of pH upon a mixing ratio between the first and second fluids

*As mixing ratio increases, fraction Of mixture that is 'second fluid' increase* pH:Mixing-ratio dependency of pH upon a mixing ratio between the first and second fluids – pH curve is specific for mixing on milk foam surface where pH of milk foam is 8

Pure first fluid

*Mixing ratio*

*As mixing ratio increases, fraction Of mixture that is 'second fluid' increase*

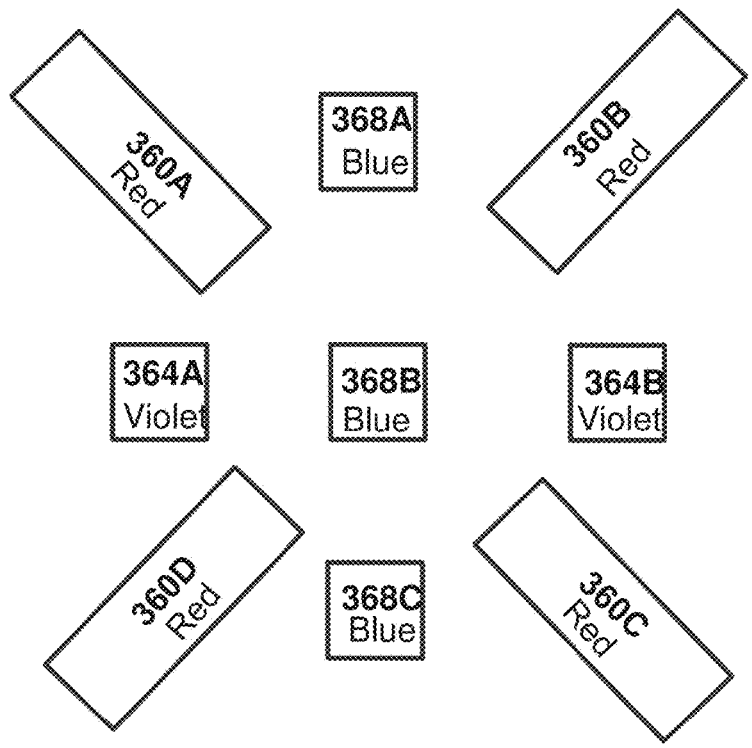

| Regions | pH | Color | Volume of First Fluid Deposited To each Pixel Location *V1* | Volume of Second Fluid Deposited To each Pixel Location *V2* | Mixing Ratio *V2/V1* | Region "Coverage"- Fraction Of Pixel Locations To which first fluid is delivered |
|---|---|---|---|---|---|---|
| Background (beer foam) | 4 | Light brown | 0 | 0 | 0 | 0 |
| 360A; 360B; 360C; 360D | 3 | Red | 45 picoliters [1 droplet] | 0 | 0 | 100 |
| 364A; 364B | 5.5 | Violet | 45 picoliters [1 droplet] | 45 picoliters [1 droplet] | 1 | 100 |
| 368A; 368B; 368C | 8 | Blue | 45 picoliters [1 droplet] | 90 picoliters [2 droplets] | 2 | 100 |

Fig. 12A

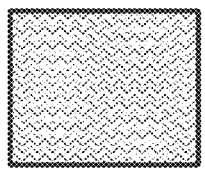 = Purple regions of ink image
Formed from colored edible ink
+ clear base fluid
(i.e. with <u>Target foam</u>)
*Mixing ratio = 1;*
*for example, one droplet of the first fluid per pixel-location;*
*One "overlay" droplet per pixel of the second fluid*
*Deposited onto the droplet of the first fluid*
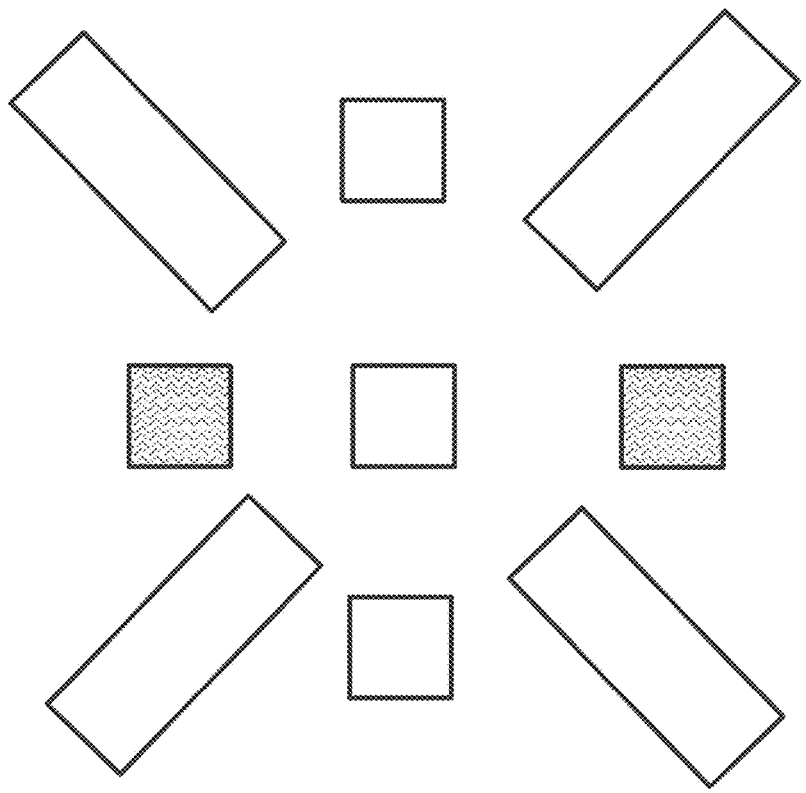
Fig. 12C

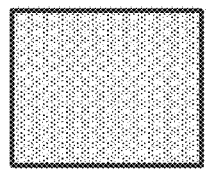 = Blue regions of ink image
Formed from colored edible ink
+ clear base fluid
(i.e. with <u>Target foam</u>)
*Mixing ratio = 2;*
*for example, one droplet of the first fluid per pixel-location;*
*Two "overlay" droplets per pixel of the second fluid*
*Deposited onto the droplet of the first fluid*
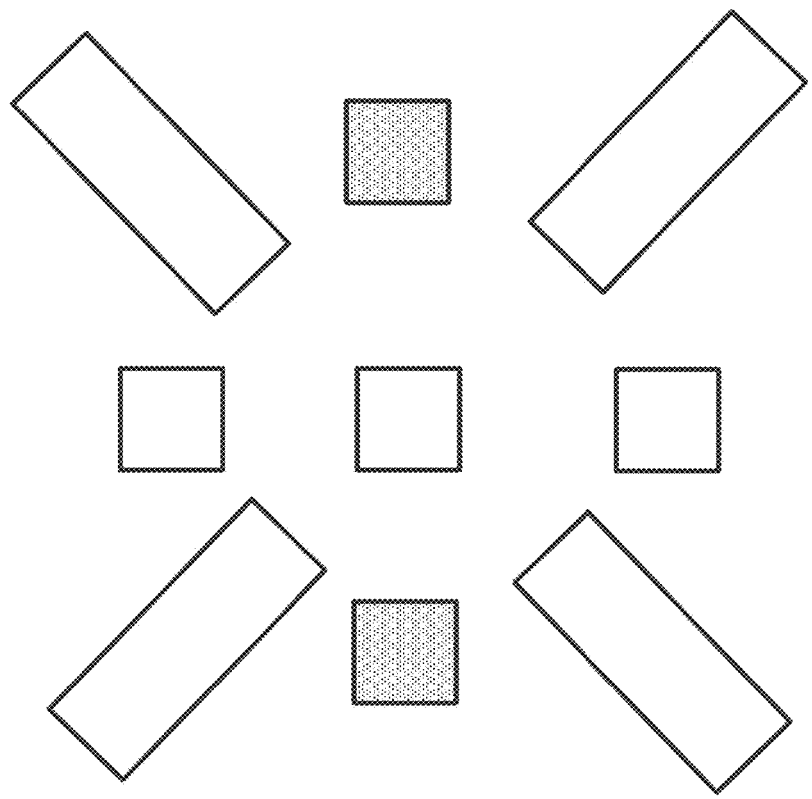
Fig. 12D Receive or compute S101 multi-color printing directive that:
(i) Targets first and second colors in an Ink-image to be printed
And/or
(ii) Targets a minimum color difference of constitutive colors in an ink-image to be printed

Deposit S109 droplets of first and second fluids to form an edible ink-image, where the depositing is performed in accordance with (e.g. to enforce) the multi-color printing directive –
for example, in accordance with a combination of, in accordance with a relationship between:
(A) the multi-color directive;
(B) a pH-color dependency of the first fluid; and
(C) a pH:mixing-ratio dependency of pH upon a mixing ratio between the first and second fluids

Fig. 14A

Receive or compute S101 multi-color printing directive that:
(i) Targets first and second colors in an Ink-image to be printed
And/or
(ii) Targets a minimum color difference of constitutive colors in an ink-image to be printed

↓

Receive or compute S113 a digital image to be printed

↓

Deposit S117 droplets of first and second fluids to convert the digital image into an edible ink-image, where the depositing is performed in accordance with (e.g. to enforce)
the multi-color printing directive –
for example, in accordance with a combination of, in accordance with a relationship between:
(A) the multi-color directive;
(B) a pH-color dependency of the first fluid; and
(C) a pH:mixing-ratio dependency of pH upon a mixing ratio between the first and second fluids

Fig. 14B

*First fluid 218 (colored)* -

Ink-jettable red edible acidic aqueous ink wherein anthocyanin-containing plant juice (e.g. filtered) or a Concentrate thereofor solids thereof
is a primary colorant of the ink
(e.g.g. having viscosity of at least 2.5 cP)

*Second fluid 230 (clear)* -

Ink-jettable clear edible ACID aqueous fluid
(e.g. Having viscosity of at least 2.5 cP)
(e.g. pH between 7.4 and 10)

Substrate = milk foam

*Digital image for first fluid*

*Digital image for second fluid*

APPARATUS, METHOD AND ARTICLE OF MANUFACTURE FOR PRODUCING AN EDIBLE MULTI-COLOR INK-IMAGE

CROSS-REFERENCE TO RELATED APPLICATIONS

This patent application claims the benefit of U.S. Provisional Patent Application No. 63/026,038 filed on May 16, 2020, which is incorporated herein by reference in its entirety.

FIELD OF THE INVENTION

The present disclosure relates to articles of manufacture, formulations, and methods for printing edible ink images (e.g. multi-color) on an edible substrate such as a foamed beverage.

BACKGROUND

Digital Images, Ink Images and Dots of Ink Images (with Reference to FIGS. 1A-1B)

In the art of ink-jet printing, it is known to print digital images (e.g. a two-dimensional array of numbers stored in computer-memory) into ink-images. Examples of digital images are binary digital images (e.g. each position in the two-dimensional array has a single bit of data), gray-scale digital images and color digital images.

The simple case of printing a binary digital image is shown in FIGS. 1A-1B. If an "x" appears at a given pixel location of the digital image, a droplet of ink is deposited via an ink-jet nozzle into a corresponding position on target substrate (e.g. fibrous substrate such as white paper). Each droplet of ink produces a dot at the target location. FIG. 1B shows 8 dots of an ink-image on substrate, each dot corresponding to a pixel position of the digital image.

Figure 1A:
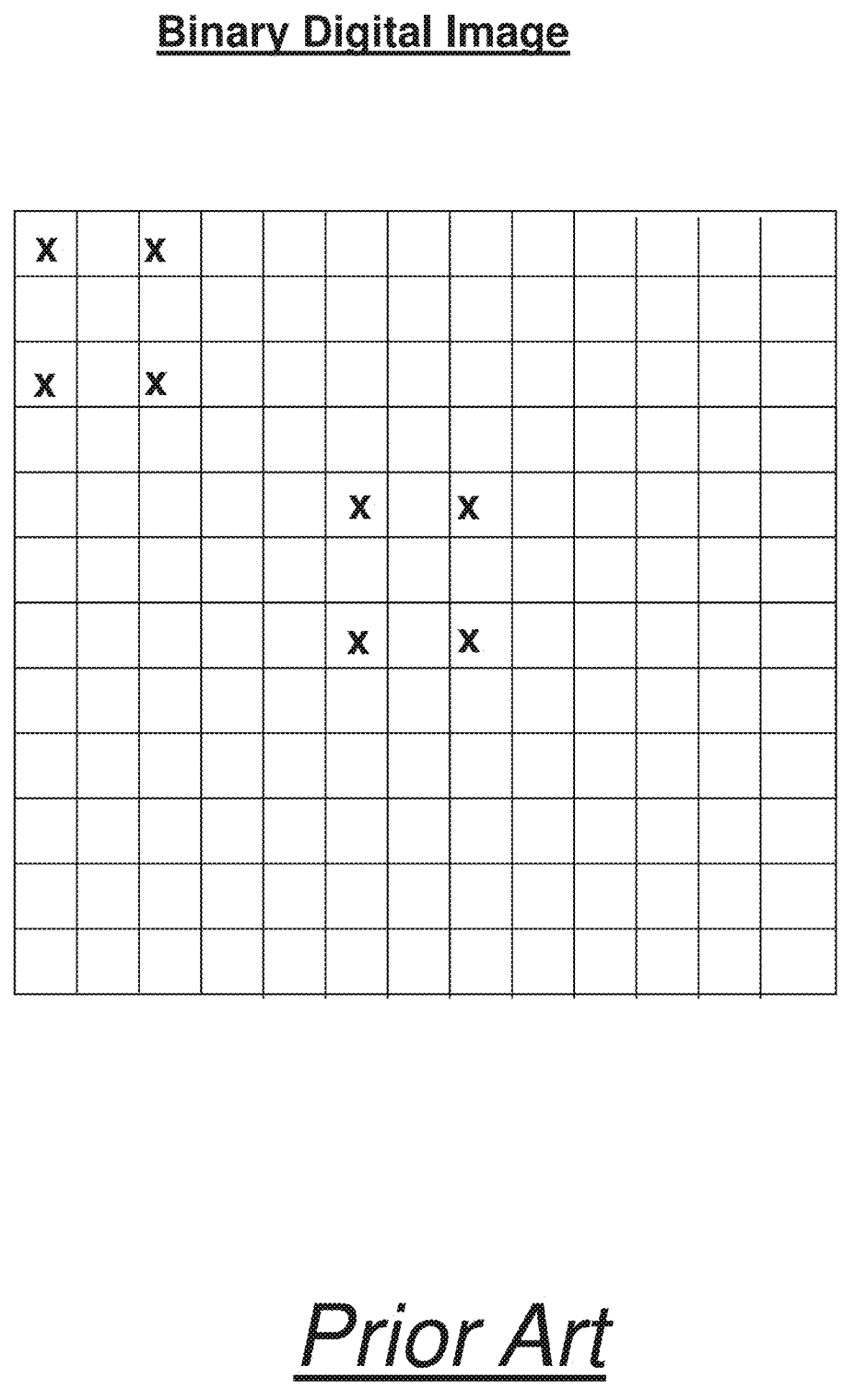

FIG. 1B shows individual dots and is a simplified example. Typically, for 300 dpi or 600 dpi the dots have diameter of up to tens of microns, and individual dots can only be viewed under magnification.

Multi-Color Ink Images (with Reference to FIGS. 2-3, 4A-4B, 5 and 6A-6B)

FIGS. 2-3, 4A-4B and 5 relate to a "first multi-color prior art example" which is discussed below. FIGS. 6A-6B relate to a "second multi-color prior art example," which is discussed below.

Color printing, and color ink-jet printing in particular, is ubiquitous in modern life. FIG. 2 (PRIOR ART) illustrates a standard color cyan, magenta, yellow, and key (black) (CYMK) ink cartridge assembly having four reservoirs of ink, each one having ink of a different respective color—i,e. cyan, magenta, yellow, and key (black).

A colour gamut is the range of possible colours that can be displayed or produced/printed. The larger the gamut, the larger the range of colours. For a standard CYMK ink cartridge assembly, it is possible to increase the color gamut beyond these four colors by: (i) layering or overlaying droplets over different colors to 'mixing' between the colors (i.e. primary colors can produce secondary colors); and/or (ii) employing half-toning techniques.

As stated in Wikipedia:
Without halftoning, the three military process colors could be printed only as solid blocks of color, and therefore could produce only seven colors: the three primaries themselves, plus three secondary colors produced by layering two of the primaries: cyan and yellow produce green, cyan and magenta produce blue, yellow and magenta produce red (these subtractive secondary colors correspond roughly to the additive primary colors), plus layering all three of them resulting in black. With halftoning, a full continuous range of colors can be produced.

FIGS. (PRIOR ART) respectively illustrates first and second binary digital (i.e. stored in computer memory) to be ink-jet printed according to the "first multi-color prior art example". The binary digital image is an array of pixels, where each pixel corresponds to a dot location in the ink-image to be ink-jet printed (e.g. each pixel may correspond to a different nozzle-location for a two-dimensional array of nozzles of an ink-jet printhead).

In the example of FIGS. 4A-4B (i.e. according to the "first multi-color prior art example"), it is intended to ink-jet print the first digital image using an ink of a first color (e.g. cyan) and to subsequently ink-jet print the second digital image using ink of a second color (e.g. magenta), to produce a multi-color ink image. In FIGS. 4A-4B the first color is schematically represented using a "vertical-lines" shading-scheme and the second color is schematically represented using "horizontal-lines" shading-scheme.

In many ink-jet systems, the multi-color image is printed sequentially, one ink-color at a time—i.e. during a first pass a first digital image is printed from using ink of a first color from a first reservoir (e.g. using a first ink-jet cartridge, or a first compartment of a common cartridge), and during a subsequent second pass a second digital image is printed using ink of a second color from a second reservoir (e.g. using a second ink-jet cartridge, or a second compartment of a common cartridge). FIG. 34 shows the multi-color image that is partially formed according to the "first multi-color prior art example"—i.e. after the first pass, a monochrome image of the first color is produced—in the simple example of FIG. 4A, this image includes 8 dots of the first color. FIG. 4B shows the multi-color ink-image that is complete—i.e. after the second pass.

FIG. 4B illustrates 12 dots according to the "first multi-color prior art example"—(i) in the upper left corner, four dots of the first color (e.g. primary color such as cyan); (ii) in the bottom right corner, four dots of the first color (e.g. primary color such as cyan); and (iii) in the center, four dots of a color mix of the first and second colors (e.g. a secondary color such as blue).

Typically, in order to achieve this color mix (e.g. the four dots in the center), the dots of the second color are layered over the dots of the first color. In this example, four dots of the second color are aimed to the same positions as four dots of the first color, and overlay them. This is one example of "print registration."

FIG. 4A-4B show individual dots and is a simplified example. Typically, for 300 dpi or 600 dpi the dots have diameter of up to tens of microns, and individual dots can only be viewed under magnification. Thus, the individual dots of the ink images of FIGS. 4A-4B would typically be only visible as individual dots under magnification.

FIG. 5 shows the multi-color same ink-image as shown in FIG. 4B, but without the magnification (assuming that each area has more than four dots)—i.e. as visible to the naked eye.

In the example of FIG. 5, the regional colors of the first, second and third regions correspond to the individual dot colors of FIG. 4B—it might be, however, a respective lighter shade if the density (e.g. derived by relation between dot diameter and distance between neighboring dots) of dots in the first, second or third region is relatively "low."

Thus, in the first multi-color prior-art example of FIGS. 2-3, 4A-4B and 5 (i.e. where there is no half-toning, only overlay of individual ink-dots), if the first color is cyan, and if the second color is magenta, and then the third color is blue. This refers to the 'dot color' of individual dots in FIG. 4B (magnified image where individual dots are visible).

If, however, the density of dots is low in the second region, then the 'region color' of a region (i.e. naked-eye visible) is a lighter shade of the 'dot color of the individual dots' in the region. For example, with reference to FIGS. 4B and 5 and the example of the previous paragraph, (i) if the dot density of the first region is sparse, then the dot color in the first region is cyan and the region color is 'light cyan'; (ii) if the dot density of the third region is sparse, then the dot color in the third region is magenta and the region color of the third region is 'light magenta'; (iii) if the dot density of the second region is sparse, then the dot color in the second region is blue (i.e. due to the overlay between the cyan and the magenta—this is their secondary color) and the region color is 'light blue.'

For the present disclosure, we distinguish between the 'dot color' of individual dots of an ink-jet image (i.e. viewable under magnification), and a 'multi-dot' regional color of a region (ie. make up for many dots) of an ink image where the region is viewable by the naked eye.

FIGS. 6A-6B show a different example—in this case, dots of both the second and third color are present in the 'second region' (i.e. according to any halftoning scheme). The region color (see FIG. 6B) of the second region (i.e. viewable to the naked eye) is an optical blend dot colors present in the second region. For example, if the first second and third colors are respectively cyan, magenta and blue, then the regional color of the second region of FIG. 6B might be a bright purple as an optical blend (i.e. due to half-toning) between cyan and blue.

Thus, in simple prior-art example of FIGS. 6A-6B, all individual dots in the second region are either blue (i.e. the third color—due to overlay between droplets or dots of cyan and magenta) or magenta (i.e. the second color)—these individual dots are viewable under magnification. The naked-eye visible second region, however, has a bright purple region color.

The prior art does teach creating new colors by combining multiple colors.

Color Wheel (with References to FIG. 7A-7B)

Color wheels illustrate an organized set of color hues around a circle. Isaac Newton, in his 1704 treatise Optiks, relate to a "color circle" to describe relations between these colors. Since that time, many color wheels and color circles have been presented in the literature. Some color wheels are based on an RYB color model using red, yellow and blue primaries. Some color wheels are based on opponent processes colors (red, yellow blue and green). Some color wheels are based on RGB (red, green, blue) additive primaries.

For the present disclosure, the specific 12-color color wheel show in FIG. 7 will be used to describe colors and transformations between colors (listed in clockwise order, from 12 o'clock): (i) yellow-green, (ii) green, (iii) blue-green, (iv) blue, (v) blue-violet, (vi) violet, (vii) red-violet, (viii) red, (ix) red-orange, (x) orange, (xi) yellow-orange, and (xii) yellow.

FIG. 7B is a table of RGB values for each of the 12 colors. The color yellow-green is given a position value of "1," the color green is given a position value of "2," the color blue-green is given a position value of "3," and so on.

Artificial and Natural Colorants

In recent decades, there is a much greater awareness of the benefits of employing natural ingredients, and in avoiding their artificial counterparts. For the case of artificial colorants in foods, the regulatory authorities generally permit the following colorants: (i) FD&C Blue No. 1—Brilliant Blue FCF, E133 (blue shade), (ii) FD&C Blue No. 2—Indigotine, E132 (indigo shade), (iii) FD&C Green No. 3—Fast Green FCF, E143 (turquoise shade), (iv) FD&C Red No. 3—Erythrosine, E127 (pink shade, commonly used in glace cherries), (v) FD&C Red No. 40—Allura Red AC, E129 (red shade), (vi) FD&C Yellow No. 5—Tartrazine, E102 (yellow shade), (vii) FD&C Yellow No. 6—Sunset Yellow FCF, E110 (orange shade) In many situations, it is more challenging to produce multi-color edible items (or multi-color surfaces thereof) when employing only natural colorants than when artificial colorants are available.

Printing on Foamed Beverages

It is known in the art to print on the upper surface of foamed beverage—see, for example, US 20190200799, US 20170066252, PCT/IB2018/058224, US 20150251470, US 20150147444, US 20090317519, all incorporated by reference herein.

SUMMARY

Inventive concept 1. A printing method comprising:
  a. providing first and second fluids, wherein:
    i. the first fluid is an acidic edible and aqueous ink comprising an extract of plant matter or solids of the extract of the plant matter, a color of both (A) the plant matter or the extract thereof or the solids of the extract therefore and (B) the aqueous ink being pH dependent;
    ii. the second fluid is an edible pH-adjusting liquid which is clear, or whose primary colorant is riboflavin or riboflavin-phosphate; and
  b. in accordance with a relationship between: (i) a pH-color dependency of the first fluid; and (ii) a pH:mixing-ratio dependency of pH upon a mixing ratio between the first and second fluids, ink-jetting droplets of both the first and second fluids to an edible substrate to print a multi-color edible ink-image thereon.

Inventive Concept 2. The method of Inventive Concept 1 wherein a primary colorant of the first fluid is the extract of plant matter or solids of the extract of the plant matter.

Inventive Concept 3. The method any of Inventive Concepts 1-2 wherein a primary colorant of the first fluid is selected from the group consisting of:
  i. anthocyanin-containing extract of anthocyanin-containing plant matter (ACE-ACPM), or solids of the ACE-ACPM;
  ii. Betanin-containing extract of Betanin-containing plant matter, or solids of the ACE-ACPM; and
  iii. combinations thereof.

Inventive Concept 4. The method of any preceding Inventive Concept wherein the pH dependency the plant matter or the extract thereof or the solids of the extract thereof is such that, for a first pH value a color of the plant matter or the extract thereof or the solids of the extract is a first plant-ingredient-color, and for a second pH value a color of the plant matter or the extract thereof or the solids of the extract is a second plant-ingredient-color.

Inventive Concept 5. The method of Inventive Concept 4 wherein at least one of the following is true:
  A. the first plant-ingredient-color is red and the second plant-ingredient-color is selected from the group consisting of blue-violet, blue, blue-green and green;

B. the first plant-ingredient-color is red and the second plant-ingredient-color is selected from the group consisting of blue, blue-green and green;

C. the first plant-ingredient-color is red-violet or violet and the second plant-ingredient-color is selected from the group consisting blue, blue-green and green; and D. the first plant-ingredient-color is red-violet or violet and the second plant-ingredient-color is selected from the group consisting blue, and green.

Inventive Concept 6. A printing method comprising:
a. providing first and second fluids, wherein:
   i. the first fluid is an acidic edible and aqueous ink whose color is pH sensitive, the first fluid comprising anthocyanin-containing extract of anthocyanin-containing plant matter (ACE-ACPM), or solids of the ACE-ACPM;
   ii. the second fluid is an edible pH-adjusting liquid which is clear, or whose primary colorant is riboflavin or riboflavin-phosphate; and
b. in accordance with a relationship between: (i) a pH-color dependency of the first fluid; and (ii) a pH:mixing-ratio dependency of pH upon a mixing ratio between the first and second fluids, ink-jetting droplets of both the first and second fluids to an edible substrate to print a multi-color edible ink-image thereon.

Inventive Concept 7. The method of Inventive Concept 6 wherein a primary colorant of the first fluid is anthocyanin.

Inventive Concept 8. The method of Inventive Concept 6 wherein a primary colorant of the first fluid is the anthocyanin-containing extract of anthocyanin-containing plant matter (ACE-ACPM), or solids of the ACE-ACPM.

Inventive Concept 9. The method of any one of Inventive Concepts 1-8 wherein the pH-adjusting liquid is a base.

Inventive Concept 10. The method of any one of Inventive Concepts 1-8 the pH-adjusting liquid is an acid.

Inventive Concept 11. The method of any of Inventive Concepts 8-9 wherein at least one of the following is true:
   i. an absolute value of a difference between respective pHs of the first fluid and the second fluid is at least 1 or at least 2 or at least 3; and
   ii. an absolute value of a difference between respective pHs of the second fluid and a surface pH of an upper surface of the substrate is at least 1 or at least 2 or least 3.

11. The method of any preceding Inventive Concept wherein the pH:mixing-ratio dependency of pH upon a mixing ratio between the first and second fluids a customized pH:mixing-ratio dependency, said customized pH:mixing-ratio dependency being customized in accordance with chemical and/or physical properties of the edible substrate or a surface thereof.

Inventive Concept 12. The method of any preceding Inventive Concept wherein a registration is performed between the ink-jetting of the droplets of the first and second fluids so that droplet(s) of the second fluid are deposited directly onto respective locations of ink-dots formed from previously-deposited droplets of the first fluid.

Inventive Concept 13. The method of any preceding Inventive Concept wherein mixing between the second fluid and ink-dots formed from the first fluid is effective to change, on the substrate surface, a color of the ink-dots formed from the first fluid.

Inventive Concept 14. The method of any preceding Inventive Concept wherein a registration is performed between the ink-jetting of the droplets of the first and second fluids so that droplets of the first fluid are deposited directly onto respective locations where droplets of the second fluid have been previously deposited.

Inventive Concept 15. The method of any preceding Inventive Concept wherein the anthocyanin-containing extract of anthocyanin-containing plant matter (ACE-ACPM) comprises red-cabbage plant matter, or primarily comprises red cabbage plant matter.

Inventive Concept 16. The method of any preceding Inventive Concept, wherein the anthocyanin-containing extract of anthocyanin-containing plant matter (ACE-ACPM) is a juice or a juice-concentrate of the anthocyanin-containing plant matter.

Inventive Concept 17. The method of any preceding Inventive Concept wherein:
   i. the multi-color edible ink-image comprises first and second sets of ink-dots whose color is respectively a first color and a second color;
   ii. a primary colorant of each ink-dot of the first set is the ACE-ACPM or solids of the ACE-ACPM of the first fluid and
   iii. a primary colorant of each ink-dot of the second set is the ACE-ACPM or solids of the ACE-ACPM of the first fluid;
   iv. the first and second colors are different from each other.

Inventive Concept 18. The method of Inventive Concept 17 wherein the first color is red and the second color is selected from the group consisting of blue-violet, blue, blue-green and green.

Inventive Concept 19. The method of Inventive Concept 17 wherein the first color is red and the second color is selected from the group consisting of blue, blue-green and green.

Inventive Concept 20. The method of Inventive Concept 17 wherein the first color is red-violet or violet and the second color is selected from the group consisting of blue, blue-green and green.

Inventive Concept 21. The method of Inventive Concept 17 wherein the first color is red-violet and the second color is selected from the group consisting of blue-green and green.

Inventive Concept 22. The method of any of Inventive Concepts 17-21 wherein the ink-image is pH heterogenous such a pH of the ink-droplets of second color exceeds a pH of the ink-droplets of the first color by at least 1.

Inventive Concept 23. The method of any of Inventive Concepts 17-21 wherein the ink-image is pH heterogenous such a pH of the ink-droplets of second color exceeds a pH of the ink-droplets of the first color by at least 2.

Inventive Concept 24. The method of any preceding Inventive Concept wherein an entirety of step (b) occurs within a time-window whose duration is at most 5 minutes, or at most 2 minutes or at most 1 minute or at most 30 seconds.

Inventive Concept 25. The method of any preceding Inventive Concept wherein a surface of the substrate, on which the ink-image is formed, is pH-homogeneous immediately before a commencing of the ink-jetting of step (b).

Inventive Concept 26. The method of any preceding Inventive Concept, performed to reproduce geometric features of the digital image Inventive Concept 27. The method of any preceding Inventive Concept wherein the digital image is a black-and-white or a gray scale image, and the droplet-deposition is performed to print a colorized version of the black-and-white or gray-scale image.

Inventive Concept 28. The method of any preceding Inventive Concept wherein a multi-color directive for printing the digital image is computed or received, and the droplet-deposition is performed in accordance with a relationship between: (i) the multi-color directive; (ii) a pH-color dependency of the first fluid; and (iii) a pH:mixing-ratio dependency of pH upon a mixing ratio between the first and second fluids, depositing droplets of both the first and second fluids to an edible substrate to print a multi-color edible ink-image thereon.

Inventive Concept 29. The method of Inventive Concept 27 wherein the multi-color directive is selected from the group consisting of reproducing a color digital image at a maximally possible color fidelity;

Inventive Concept 30. The method of any preceding Inventive Concept wherein a 25° C. viscosity of the first fluid is at least 2.5 centipoise (cP) and/or a 25° C. viscosity of the second fluid is at least 2.5 centipoise (cP).

Inventive Concept 31. The method of any preceding Inventive Concept wherein the second fluid comprises at least 30% wt/wt glycerol.

Inventive Concept 32. The method of any preceding Inventive Concept wherein a 25° C. viscosity of the first fluid is at least 2 or at least 2.5 centipoise (cP) and/or a 25° C. viscosity of the first fluid is at most 10 centipoise (cP) or at most 8 cP or at most 6 cP—for example, between 2.5 and 6 cP.

Inventive Concept 33. The method of any preceding Inventive Concept wherein a 25° C. viscosity of the second fluid is at least 2 or at least 2.5 centipoise (cP) and/or a 25° C. viscosity of the second fluid is at most 10 centipoise (cP) or at most 8 cP or at most 6 cP—for example, between 2.5 and 6 cP.

Inventive Concept 34. The method of any preceding Inventive Concept wherein the second fluid is clear or wherein a primary colorant of a 50/50 mixture of the first and second fluids is the ACE-ACPM or the solids of the ACE-ACPM, the 50/50 mixture comprising 50% wt/wt of the first fluid and 50% wt/wt of the second fluid.

Inventive Concept 35. The method of any preceding Inventive Concept wherein the second fluid is clear or wherein a primary colorant of a 30/70 mixture of the first and second fluids is the ACE-ACPM or the solids of the ACE-ACPM, the 30/70 mixture comprising 30% wt/wt of the first fluid and 70% wt/wt of the second fluid.

Inventive Concept 36. The method of any preceding Inventive Concept, wherein the second fluid is a base, and a water activity thereof is at most 0.85 or at most 0.84 or at most 0.82 or at most 0.8 or at most 0.78 or at most 0.75.

Inventive Concept 37. The method of any preceding Inventive Concepts wherein the first and/or the second fluid lacks artificial colorants other than riboflavin or riboflavin-phosphate, or comprises at most 250 ppm or at most 150 ppm or at most 100 ppm or at most 50 ppm or at most 25 ppm or at most 15 ppm or at most 10 ppm or at most 5 ppm artificial colorants other than riboflavin or riboflavin phosphate.

Inventive Concept 38. The method of any preceding Inventive Concept, wherein the first and/or the second fluids are free of particles whose size exceeds 1 micron.

Inventive Concept 39. The method of any preceding Inventive Concept wherein the edible substrate is a foamed beverage.

Inventive Concept 40. The method of Inventive Concept 39 wherein a foam of the foamed beverage comprises egg whites/or fava water/or nitro beverage and lemon juice, and/or the foamed beverage is a cocktail.

Inventive Concept 41. The method of Inventive Concept 39 wherein a foam is selected from the group consisting of a beer foam, a milk foam and a milk-substitute foam.

Inventive Concept 42. The method of any preceding Inventive Concept wherein a third fluid is provided, the third fluid being an additional edible pH-adjusting liquid which is clear, or whose primary colorant is riboflavin or riboflavin-phosphate.

Inventive Concept 43. The method of Inventive Concept 42 wherein in step b, droplets of the first, second and third fluids are ink-jetted to the edible substrate such that (i) there is droplet-location registration between droplets of the first and second fluids; (ii) there is droplet-location registration between droplets of the first and third fluids; (iii) the second and third fluids are respectively basic and acidic; (iv) in pixel-locations where droplets of both the first and third fluids are deposited, respective ink-dots formed therefrom are of a first color; and (v) in pixel-locations where droplets of both the first and second fluids are deposited, respective ink-dots formed therefrom are of a second color.

Inventive Concept 44. The method of Inventive Concept 43 wherein the first and second colors are respectively red and blue or respectively red and blue-green or respectively red and green.

Inventive Concept 45. The method of any preceding Inventive Concept wherein a primary colorant of the first fluid is red-cabbage extract or solids thereof.

Inventive Concept 46. The method of any preceding Inventive Concept wherein a primary colorant of the first fluid is red-cabbage juice or concentrate thereof or solids thereof.

Inventive Concept 47. A system for ink-jet printing, the system comprising:
   a. an ink-jet printer defining a target-location;
   b. first and second reservoirs of fluids respectively loaded with first and second fluids, wherein:
      i. the first fluid is an acidic edible and aqueous ink comprising an extract of plant matter or solids of the extract of the plant matter, a color of both (A) the plant matter or the extract thereof or the solids of the extract therefore and (B) the aqueous ink being pH dependent;
      ii. the second fluid is an edible pH-adjusting liquid which is clear, or whose primary colorant is riboflavin or riboflavin-phosphate; and
   c. control circuitry for controlling deposition of droplets to print a multi-color edible in image onto a substrate disposed at the target-location by ink-jetting thereon droplets of both the first and second fluids, wherein the ink-jetting of the droplets of the first and second fluids is controlled in accordance with a combination of: (i) a pH-color dependency of the first fluid; and (ii) a pH:mixing-ratio dependency of pH upon a mixing ratio between the first and second fluids Inventive Concept 48. The system of Inventive Concept 47 wherein a primary colorant of the first fluid is the extract of plant matter or solids of the extract of the plant matter.

Inventive Concept 49. The system any of Inventive Concepts 47-48 wherein a primary colorant of the first fluid is selected from the group consisting of:
   i. anthocyanin-containing extract of anthocyanin-containing plant matter (ACE-ACPM), or solids of the ACE-ACPM;
   ii. Betanin-containing extract of Betanin-containing plant matter, or solids of the ACE-ACPM; and
   iii. combinations thereof.

Inventive Concept 50. The system of any of Inventive Concepts 47-49 wherein the pH dependency the plant matter or the extract thereof or the solids of the extract thereof is such that, for a first pH value a color of the plant matter or the extract thereof or the solids of the extract is a first plant-ingredient-color, and for a second pH value a color of the plant matter or the extract thereof or the solids of the extract is a second plant-ingredient-color.

Inventive Concept 51. The system of Inventive Concept 50 wherein at least one of the following is true:
- A. the first plant-ingredient-color is red and the second plant-ingredient-color is selected from the group consisting of blue-violet, blue, blue-green and green;
- B. the first plant-ingredient-color is red and the second plant-ingredient-color is selected from the group consisting of blue, blue-green and green;
- C. the first plant-ingredient-color is red-violet or violet and the second plant-ingredient-color is selected from the group consisting blue, blue-green and green; and
- D. the first plant-ingredient-color is red-violet or violet and the second plant-ingredient-color is selected from the group consisting blue, and green.

Inventive Concept 52. A system for ink-jet printing, the system comprising:
- a. an ink-jet printer defining a target-location;
- b. first and second reservoirs of fluids respectively loaded with first and second fluids, wherein:
  - i. the first fluid is an acidic edible and aqueous ink whose color is pH sensitive, the first fluid comprising anthocyanin-containing extract of anthocyanin-containing plant matter (ACE-ACPM), or solids of the ACE-ACPM;
  - ii. the second fluid is an edible pH-adjusting liquid which is clear, or whose primary colorant is riboflavin or riboflavin-phosphate; and
- c. control circuitry for controlling deposition of droplets to print a multi-color edible in image onto a substrate disposed at the target-location by ink-jetting thereon droplets of both the first and second fluids, wherein the ink-jetting of the droplets of the first and second fluids is controlled in accordance with a combination of: (i) a pH-color dependency of the first fluid; and (ii) a pH:mixing-ratio dependency of pH upon a mixing ratio between the first and second fluid Inventive Concept 53. The system of Inventive Concept 52 wherein a primary colorant of the first fluid is anthocyanin.

Inventive Concept 54. The system of Inventive Concept 52 wherein a primary colorant of the first fluid is the anthocyanin-containing extract of anthocyanin-containing plant matter (ACE-ACPM), or solids of the ACE-ACPM.

Inventive Concept 55. The system of any one of Inventive Concepts 47-54 wherein the pH-adjusting liquid is a base.

Inventive Concept 56. The method of any one of Inventive Concepts 47-54 the pH-adjusting liquid is an acid.

Inventive Concept 57. An article of manufacture comprising:
- a. an edible substrate;
- b. a pH-heterogeneous edible ink-image disposed on an upper surface of the edible substrate, the ink-image comprising a first and second set of ink-dots, wherein:
  - i. for each given ink-dot of both the first and second sets of ink-dots, a primary colorant thereof is an extract of plant matter or solids of the extract of the plant matter, wherein a color of the extract of plant matter or solids of the extract of the plant matter is pH sensitive;
  - ii. for each given ink-dot of the first sets of ink-dots, a pH thereof is within 0.5 or within 1 or within 1.5 of a common first pH value and a color thereof is a first dot-color;
  - iii. for each given ink-dot of the first sets of ink-dots, a pH thereof is within 0.5 or within 1 or within 1.5 of a common second pH value and a color thereof is a second dot-color;
  - iv. an absolute value of a difference between the first and second pH values is at least 1.5 or at least 2 or at least 2.5 or at least 3 or at least 4; and
  - v. at least one of a first dot-color-condition, a second dot-color-condition, a third dot-color-condition, and a fourth dot-color-condition is true, the dot-color conditions being defined as follows:
    - A. according to the first dot-color-condition, the first dot-color is red and the second dot-color is selected from the group consisting of blue-violet, blue, blue-green and green;
    - B. according to the second dot-color-condition, the first dot-color is red and the second dot-color is selected from the group consisting of blue, blue-green and green;
    - C. according to the third dot-color-condition, the first dot-color is red-violet or violet and the second dot-color is selected from the group consisting blue, blue-green and green; and
    - D. according to the fourth dot-color-condition, the first dot-color is red-violet or violet and the second dot-color is selected from the group consisting blue, and green.

Inventive Concept 58. An article of manufacture comprising:
- a. an edible substrate;
- b. a pH-heterogeneous edible ink-image disposed on an upper surface of the edible substrate, the ink-image comprising a first and second set of ink-dots, wherein:
  - i. for each given ink-dot of both the first and second sets of ink-dots, a primary colorant thereof is anthocyanin;
  - ii. for each given ink-dot of the first sets of ink-dots, a pH thereof is within 0.5 or within 1 or within 1.5 of a common first pH value and a color thereof is a first dot-color;
  - iii. for each given ink-dot of the first sets of ink-dots, a pH thereof is within 0.5 or within 1 or within 1.5 of a common second pH value and a color thereof is a second dot-color;
  - iv. an absolute value of difference between the first and second pH values is at least 1.5 or at least 2 or at least 2.5 or at least 3 or at least 4; and
  - v. at least one of a first dot-color-condition, a second dot-color-condition, a third dot-color-condition, and a fourth dot-color-condition is true, the dot-color conditions being defined as follows:
    - A. according to the first dot-color-condition, the first dot-color is red and the second dot-color is selected from the group consisting of blue-violet, blue, blue-green and green;
    - B. according to the second dot-color-condition, the first dot-color is red and the second dot-color is selected from the group consisting of blue, blue-green and green;
    - C. according to the third dot-color-condition, the first dot-color is red-violet or violet and the second dot-color is selected from the group consisting blue, blue-green and green; and
    - D. according to the fourth dot-color-condition, the first dot-color is red-violet or violet and the second dot-color is selected from the group consisting blue, and green.

Inventive Concept 59. The article of any one of Inventive Concepts 57-58 wherein the edible surface is a foamed beverage and the edible ink-image disposed on an upper surface of the foamed beverage.

Inventive Concept 60. The article of any one of Inventive Concepts 57-58 wherein the edible surface is rice paper and the edible ink-image disposed on an upper surface of the rice paper.

Inventive Concept 61. The article of any one of Inventive Concepts 57-60 wherein each given dot of the first and second set of ink-dots comprises anthocyanin-containing extract of anthocyanin-containing plant matter (ACE-ACPM), or solids of the ACE-ACPM.

Inventive Concept 62. The article of any one of Inventive Concepts 57-61 wherein for each given dot of the first and second set of ink-dot, a primary colorant thereof is anthocyanin-containing extract of anthocyanin-containing plant matter (ACE-ACPM), or solids of the ACE-ACPM.

63. The article of any one of Inventive Concepts 57-63, where each ink-dot of the first ink-dots has a diameter of at most 100 microns.

Inventive Concept 64. The article of any one of Inventive Concepts 57-63 wherein at least the first dot-color-condition is true.

Inventive Concept 65. The article of any one of Inventive Concepts 57-64 at least the second dot-color-condition is true.

Inventive Concept 66. The article of any one of Inventive Concepts 57-65 wherein at least the third dot-color-condition is true.

Inventive Concept 67. The article of any one of Inventive Concepts 57-66 wherein at least the fourth dot-color-condition is true.

Inventive Concept 68. A printing method comprising:
 a. providing first and second fluids, wherein:
  i. the first fluid is an acidic edible and aqueous ink comprising an extract of plant matter or solids of the extract of the plant matter, a color of both (A) the plant matter or the extract thereof or the solids of the extract therefore and (B) the aqueous ink being pH dependent;
  ii. the second fluid is an edible pH-adjusting liquid which is clear, or whose primary colorant is riboflavin or riboflavin-phosphate; and
 b. ink-jetting droplets of both the first and second fluids to an edible substrate to print a pH heterogeneous multi-color edible ink-image thereof, the multi-color edible ink-image comprising first and second sets of ink-dots, wherein:
  i. for each given ink-dot of both the first and second sets of ink-dots, a primary colorant thereof is anthocyanin;
  ii. for each given ink-dot of the first sets of ink-dots, a pH thereof is within 0.5 or within 1 or within 1.5 of a common first pH value and a color thereof is a first dot-color;
  iii. for each given ink-dot of the first sets of ink-dots, a pH thereof is within 0.5 or within 1 or within 1.5 of a common second pH value and a color thereof is a second dot-color;
  iv. an absolute value of a difference between the first and second pH values is at least 1.5 or at least 2 or at least 2.5 or at least 3 or at least 4; and
  v. at least one of a first dot-color-condition, a second dot-color-condition, a third dot-color-condition, and a fourth dot-color-condition is true, the dot-color conditions being defined as follows:
   A. according to the first dot-color-condition, the first dot-color is red and the second dot-color is selected from the group consisting of blue-violet, blue, blue-green and green;
   B. according to the second dot-color-condition, the first dot-color is red and the second dot-color is selected from the group consisting of blue, blue-green and green;
   C. according to the third dot-color-condition, the first dot-color is red-violet or violet and the second dot-color is selected from the group consisting blue, blue-green and green; and
   D. according to the fourth dot-color-condition, the first dot-color is red-violet or violet and the second dot-color is selected from the group consisting blue, and green.

Inventive Concept 69. The method of Inventive Concept 68 wherein a primary colorant of the first fluid is the extract of plant matter or solids of the extract of the plant matter.

Inventive Concept 70. The method any of Inventive Concepts 68-69 wherein a primary colorant of the first fluid is selected from the group consisting of:
 i. anthocyanin-containing extract of anthocyanin-containing plant matter (ACE-ACPM), or solids of the ACE-ACPM;
 ii. Betanin-containing extract of Betanin-containing plant matter, or solids of the ACE-ACPM; and
 iii. combinations thereof.

Inventive Concept 71. The method of any of Inventive Concepts 68-70 wherein the pH dependency the plant matter or the extract thereof or the solids of the extract thereof is such that, for a first pH value a color of the plant matter or the extract thereof or the solids of the extract is a first plant-ingredient-color, and for a second pH value a color of the plant matter or the extract thereof or the solids of the extract is a second plant-ingredient-color.

Inventive Concept 71. The method of Inventive Concept 70 wherein at least one of the following is true:A. the first plant-ingredient-color is red and the second plant-ingredient-color is selected from the group consisting of blue-violet, blue, blue-green and green;
 B. the first plant-ingredient-color is red and the second plant-ingredient-color is selected from the group consisting of blue, blue-green and green;
 C. the first plant-ingredient-color is red-violet or violet and the second plant-ingredient-color is selected from the group consisting blue, blue-green and green; and
 D. the first plant-ingredient-color is red-violet or violet and the second plant-ingredient-color is selected from the group consisting blue, and green.

Inventive Concept 72. A printing method comprising:
 a. providing first and second fluids, wherein:
  i. the first fluid is an acidic edible and aqueous ink whose color is pH sensitive, the first fluid comprising anthocyanin-containing extract of anthocyanin-containing plant matter (ACE-ACPM), or solids of the ACE-ACPM;
  ii. the second fluid is an edible pH-adjusting liquid which is clear, or whose primary colorant is riboflavin or riboflavin-phosphate; and
 b. ink-jetting droplets of both the first and second fluids to an edible substrate to print a pH heterogeneous multi-color edible ink-image thereof, the multi-color edible ink-image comprising first and second sets of ink-dots, wherein:

i. for each given ink-dot of both the first and second sets of ink-dots, a primary colorant thereof is anthocyanin;
ii. for each given ink-dot of the first sets of ink-dots, a pH thereof is within 0.5 or within 1 or within 1.5 of a common first pH value and a color thereof is a first dot-color;
iii. for each given ink-dot of the first sets of ink-dots, a pH thereof is within 0.5 or within 1 or within 1.5 of a common second pH value and a color thereof is a second dot-color;
iv. an absolute value of a difference between the first and second pH values is at least 1.5 or at least 2 or at least 2.5 or at least 3 or at least 4; and
v. at least one of a first dot-color-condition, a second dot-color-condition, a third dot-color-condition, and a fourth dot-color-condition is true, the dot-color conditions being defined as follows:
  A. according to the first dot-color-condition, the first dot-color is red and the second dot-color is selected from the group consisting of blue-violet, blue, blue-green and green;
  B. according to the second dot-color-condition, the first dot-color is red and the second dot-color is selected from the group consisting of blue, blue-green and green;
  C. according to the third dot-color-condition, the first dot-color is red-violet or violet and the second dot-color is selected from the group consisting blue, blue-green and green; and
  D. according to the fourth dot-color-condition, the first dot-color is red-violet or violet and the second dot-color is selected from the group consisting blue, and green.

Inventive Concept 73. The method of any Inventive Concept 72 wherein for each given dot of the first and second set of ink-dot, a primary colorant thereof is anthocyanin-containing extract of anthocyanin-containing plant matter (ACE-ACPM), or solids of the ACE-ACPM.

Inventive Concept 74. The method of any Inventive Concept any one of Inventive Concepts 72-73, where each ink-dot of the first ink-dots has a diameter of at most 100 microns.

Inventive Concept 75. The method of any Inventive Concept any one of Inventive Concepts 72-74, wherein at least the first dot-color-condition is true.

Inventive Concept 76. The method of any Inventive Concept any one of Inventive Concepts 72-75, wherein at least the second dot-color-condition is true.

Inventive Concept 77. The method of any Inventive Concept any one of Inventive Concepts 72-76, wherein at least the third dot-color-condition is true.

Inventive Concept 78. The method of any Inventive Concept any one of Inventive Concepts 72-79, wherein at least the fourth dot-color-condition is true.

Inventive Concept 79. The invention of any preceding Inventive Concept wherein a primary-colorant-threshold parameter is set to at least 60.

Inventive Concept 80. The invention of any preceding Inventive Concept wherein a primary-colorant-threshold parameter is set to at least 75.

Inventive Concept 81. The invention of any preceding Inventive Concept wherein a primary-colorant-threshold parameter is set to at least 90.

Inventive Concept 82. The invention any preceding Inventive Concept wherein the first and/or the second fluid lacks artificial colorants other than riboflavin or riboflavin-phosphate, or comprises at most 250 ppm or at most 150 ppm or at most 100 ppm or at most 50 ppm or at most 25 ppm or at most 15 ppm or at most 10 ppm or at most 5 ppm artificial colorants other than riboflavin or riboflavin phosphate.

Inventive Concept 83. The invention of any preceding Inventive Concept wherein a primary colorant of the first fluid is red-cabbage extract or solids thereof.

Inventive Concept 84. The invention of any preceding Inventive Concept wherein a primary colorant of the first fluid is red-cabbage juice or concentrate thereof or solids thereof.

BRIEF DESCRIPTION OF THE DRAWINGS

FIGS. 1A-1B, 2-3, 4A-4B, 5 and 6A-6B are prior examples of digital images and ink images.
FIGS. 7A-7B (prior art) describe a color wheel.
FIGS. 12A-12D, and 13A-13B relate schematically to FIG. 9.
FIGS. 14A-14B are flows charts of methods for printing
FIGS. 10, 11A-11C graph fluid property(ies).

DETAILED DESCRIPTION OF EMBODIMENTS

Figure 1B:
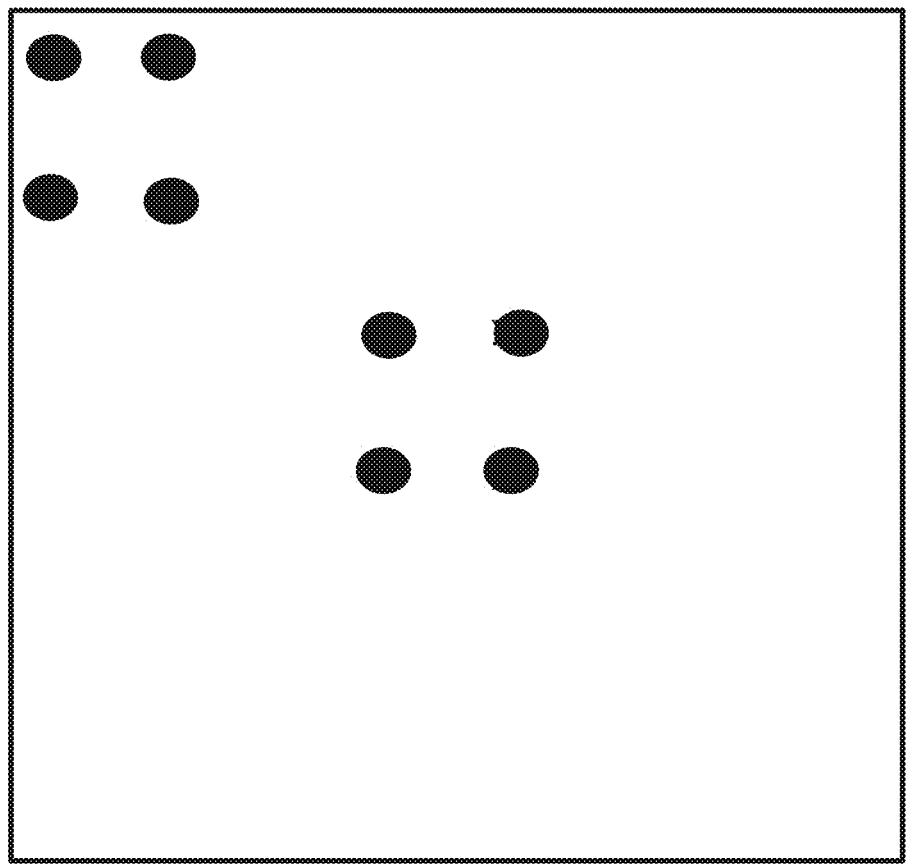
Figure 4A:
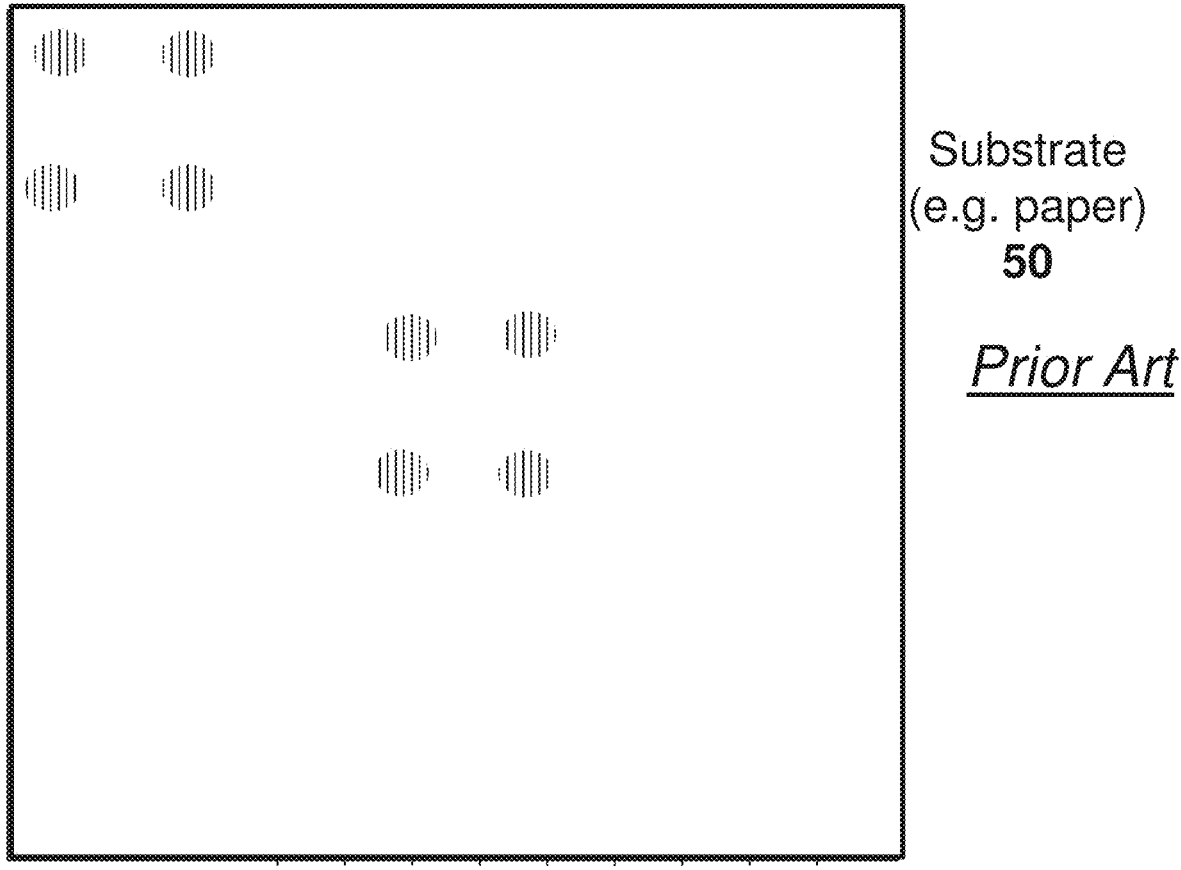
Figure 5:
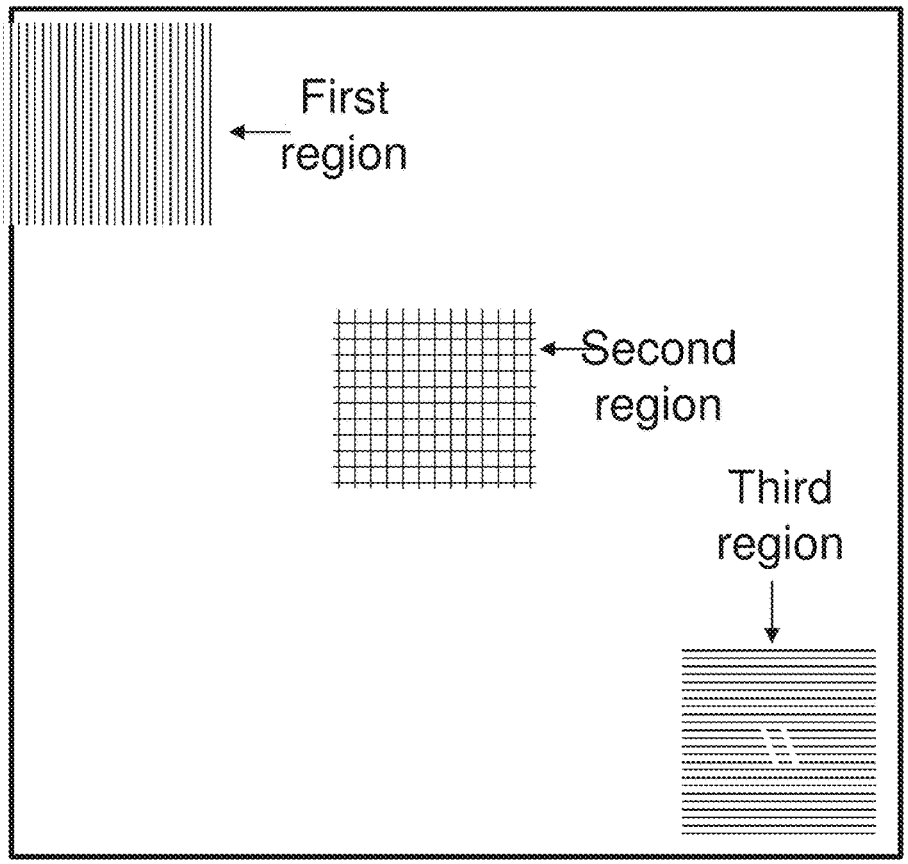

The formulations, articles of manufacture and methods according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Some embodiments relate to a printing method comprising the following steps:

STEP A: providing a first fluid (e.g. element 218 of FIGS. 8A-8B or FIGS. 17A-17B, discussed below) and a second fluid (e.g. element 220 of FIGS. 8A-8B or element 230 of FIG. 17A-17B, or a version thereof that includes riboflavin or riboflavin phosphate) wherein:
  i. the first fluid is an acidic edible and aqueous ink whose color is pH sensitive, a primary colorant of the first fluid being anthocyanin-containing concentrate of anthocyanin-containing plant matter (ACC-ACPM), or solids of the ACC-ACPM;
  ii. the second fluid is an edible pH-adjusting liquid which is clear, or whose primary colorant is riboflavin or riboflavin-phosphate; and STEP B. in accordance with a relationship between: (i) a pH-color dependency of the first fluid (see, for example FIG. 10); and (ii) a pH:mixing-ratio dependency of pH upon a mixing ratio between the first and second fluids (see, for example, any of FIGS. 11-11A-11C), ink-jetting droplets of both the first and second fluids to an edible substrate to print a multi-color edible ink-image thereon.

One purpose of the "pH adjusting liquid" is to modify pH. In some embodiments, a pH of the pH adjusting liquid differs from that of the first fluid. Alternatively or additionally, a pH of the pH adjusting liquid differs from an upper surface of the substrate. Alternatively or additionally, a pH of the pH adjusting liquid differs from the a combination of the first fluid and upper surface of the substrate (e.g. after contact therebetween).

Before discussing this method in greater details, an overview is now provided.

Producing a Multi-Color Image by Ink-Jetting Two Fluids, Only One of which is Colored Embodiments of the present invention relate to printing an edible image using an edible ink (e.g. first fluid 218) comprising an anthocyanin-containing concentrate of anthocyanin-containing plant matter (ACC-ACPM) (or solids of the ACC-ACPM). One example of anthocyanin-containing plant matter (CC-ACPM) is red cabbage. In embodiments of the invention, a primary colorant of the edible ink (e.g first fluid 218) is the ACC-ACPM or solids thereof.

Embodiments of the invention relate to producing, by ink-jet droplet-deposition, a multi-color image using two fluids (e.g. only two fluids), both of which are ink-jettable but only one of which is colored. The first fluid is an acidic edible ink whose specific color depends on pH (e.g. a primary colorant is the first fluid is extract of anthocyanin-containing plant matter—for example, red cabbage extract or solids thereof), while the second fluid is a clear fluid whose purpose is to modify in-situ (i.e. on the surface of the substrate) respective local pH of individuals droplets (or ink-dots formed therefrom) of the first fluid.

For edible inks (i e first fluid) whose primary colorant is red cabbage extract (see the section below, entitled "Example First Fluid Formulation Used to Print the Multi-Color Image of FIG. 9"), a pH dependence of color of the first ink may be described as follows: (i) at a pH value of around 3, a color of the "first fluid" is red; (ii) at a pH value of around 6, a color of the ink is violet, and (iii) at a pH value of around 8 the ink is blue, and for pH values of around 9 the ink is green. See, for example, FIG. 10 discussed below.

In one example, droplets of a first fluid whose primary colorant is red cabbage extract are deposited onto the surface of a target substrate which is of uniform pH (i.e. a pH-homogeneous surface) to form a monochrome image of a first color. Subsequently, droplets of the second fluid (i.e. the base—e.g. a viscosity thereof is at least 2.5 centipoise (cp)) are deposited (e.g. by ink-jet) directly onto only some of the ink-dots of this monochrome image (one droplet of the second fluid, per ink-dot) to convert this pre-existing monochrome image into a multi-color image.

The ink-dots where no second fluid is deposited remain the first color. For the ink-dots where the second fluid is deposited, two things occurs: (i) a pH of each ink-dot is increased in situ (i.e. on the substrate surface) when the droplet of the second fluid (i.e. the base) mixes with each of these ink dots; and (ii) a color of the ink-dot changes in-situ from a first color to a second color.

In one specific case, (i) the first fluid is FORMULATION_A (see below—"Example First Fluid Formulation Used to Print the Multi-Color Image of FIG. 9"); (ii) a local pH of dots of the monochrome image is 3.1; (iii) the first color is read; (iv) a local pH of the ink-dots where the second fluid is deposited is 8; and (v) the second color is blue.

Thus, it is possible to generate multi-color images (i.e. comprising red and blue dots) not by depositing inks of different colors, but rather by in situ conversion of a proper sub-set of ink-dots already on the substrate from a first color to a second color. This in situ conversation may be performed by converting an acidic form of anthocyanin molecules to neutral or basic forms thereof, or (in other examples) vice versa.

The term in situ conversion by the second fluid refers to one of the following: (i) converting a pH and/or color of a pre-existing ink-dot formed by the first fluid by subsequent mixing of this ink-dot with the second fluid (e.g. subsequent overlay with droplet(s) of the second fluid)—e.g. as discussed above; and (ii) first depositing droplets of the second fluid, so that upon landing on location where the droplet(s) of the second fluid were deposited, a pH (and thus color) of the first fluid changes due to the pre-existing presence of the first fluid.

One salient feature of the multi-color image described above is the following—even though the substrate surface is pH-homogeneous (i.e. the 'background surface' upon which the multi-color image resides), the multi-color image is pH-heterogenous. In this example: in the red-regions of the multi-color image, a local pH is about 3, and in the blue regions of the multi-color image, a local pH of about 8.

Figure 9:
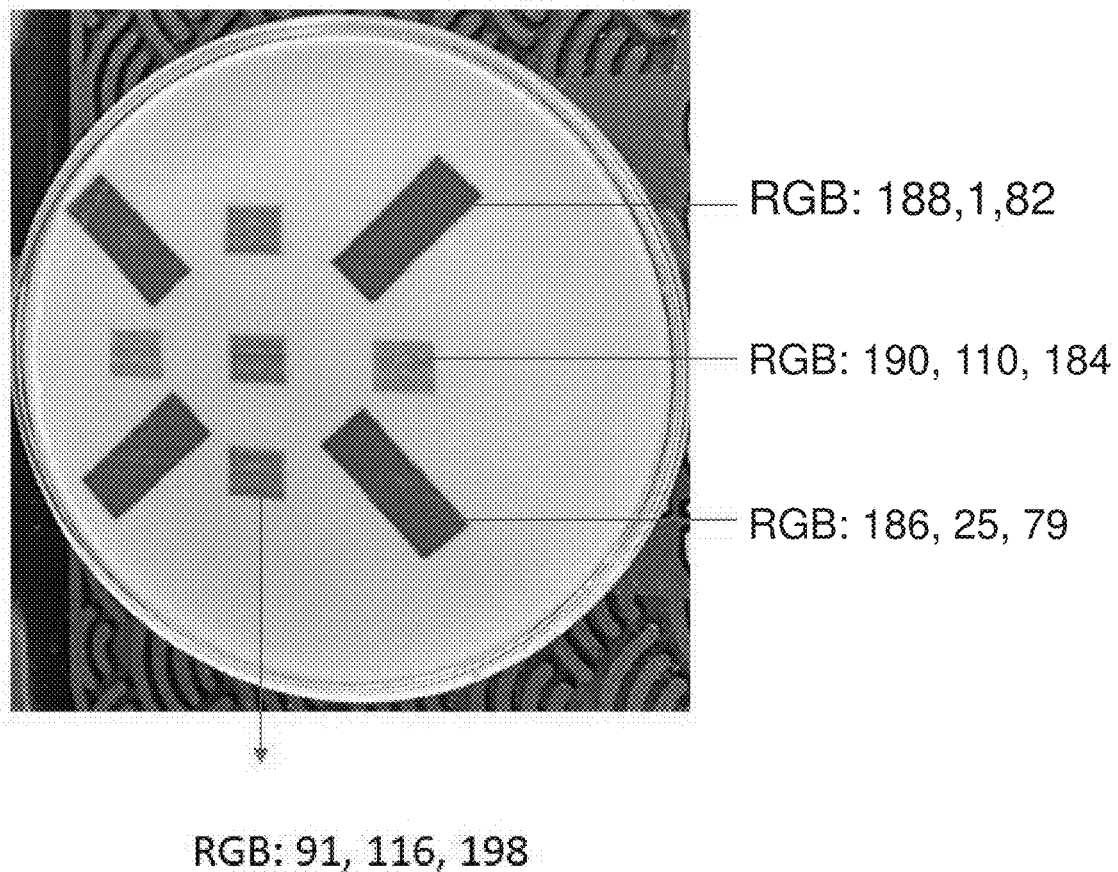
FIGS. 9, 15, 16A, 18, and 20 are photographs of ink-images.

FIG. 9 shows one example of such a multi-color image.

Figure 8A:
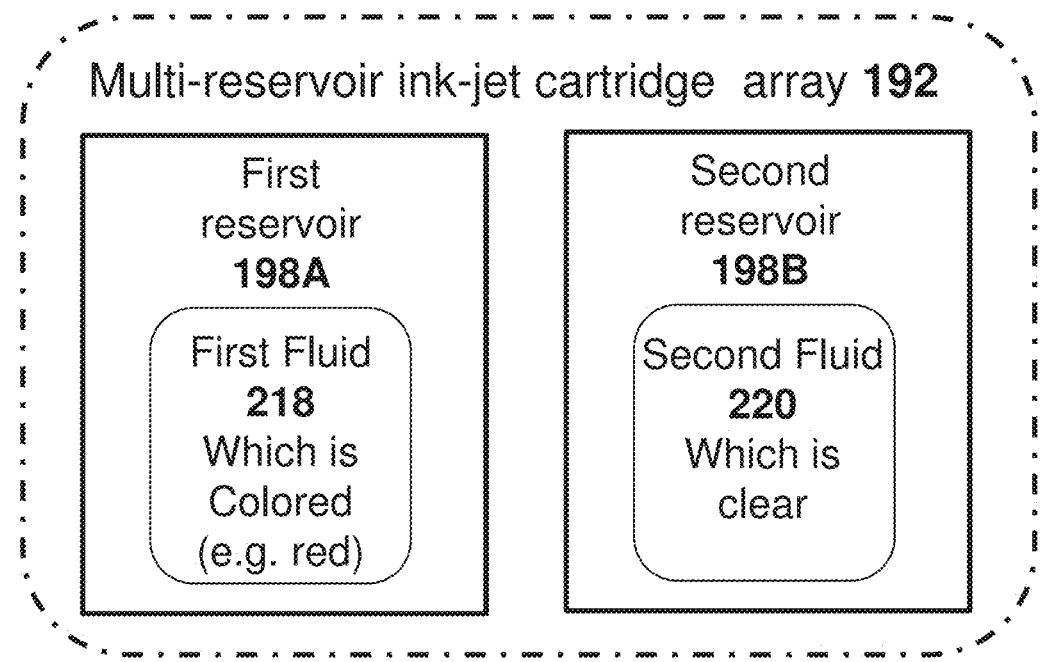
FIGS. 8A-8B, 17A-17B and 19 describes arrangements for ink-jet printing.
Figure 8B:
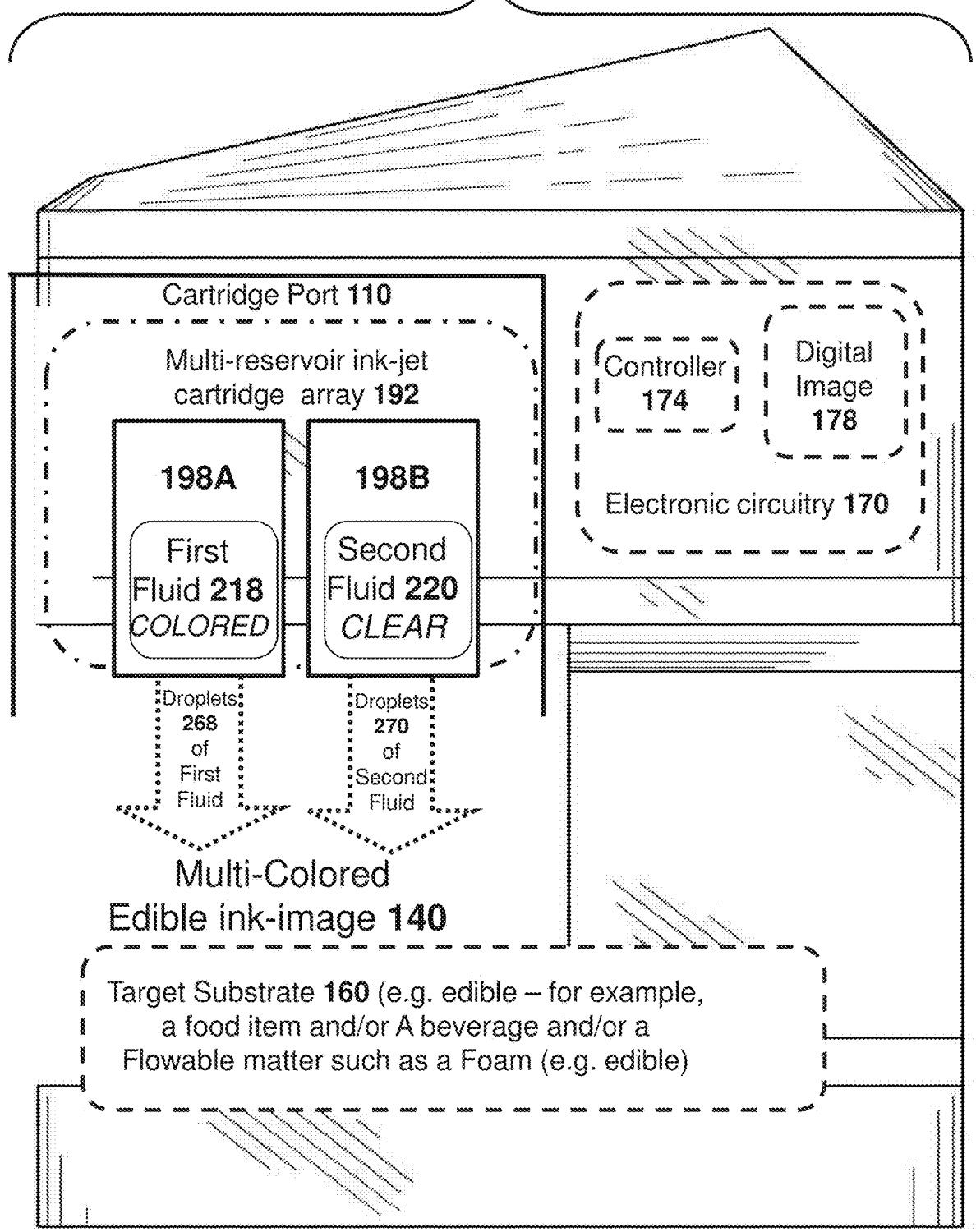

A Discussion of FIGS. 8A-8B and 9

FIG. 8A-8B show an ink-jet printing comprising multi-reservoirs 198A, 198B for storing of fluid to be ink-jet. In a non-limiting example, the reservoirs are part of a multi-reservoir ink-jet cartridge array where a cartridge array refers to one or more ink cartridges. In one example, reservoir 198A is a reservoir of a first ink-jet cartridge and reservoir 198B is a reservoir of a second ink-jet cartridge. In another example, reservoirs 198A and 198B are different reservoirs of a single ink-jet cartridge.

The ink-jet cartridge may be bubble jet (thermal ink-jet) or piezo.

The ink-jet deposition of droplets 268, 270 is controlled, for example, by electronic circuitry 170 which prints a digital image 178 (e.g. a color digital image) in accordance with a combination of: (A) a pH-color dependency of the first fluid 198A (see, for example, FIG. 10 discussed below) and (B) a pH:mixing-ratio dependency of pH upon a mixing ratio between the first and second fluids (see, for example, FIGS. 11A-11C discussed below).

The result of the droplet deposition is a multi-color edible ink-image 140 disposed on target substrate 160.

FIGS. 8A-8B and 9 are now discussed in terms of a specific non-limiting use-case, related to that of the previous section.

In this use-case, a multi-color edible ink-image 140 having both red and blue regions is formed onto beer foam (i.e. an example of 160) from the first 218 and second 220 fluids which respectively are disposed in first 198A and second 198B reservoirs. According to this non-limiting use-case, the multi-color edible ink-image 160 comprises first and second regions which are respectively red and blue, and the multi-color edible ink-image 160 is produced as follows:

(i) within the first region of the multi-color ink-image 160, only droplets 268 of the first fluid 218 are deposited, and all dots within the first region are red. In particular, since a pH of the beer foam (i.e. an example of 160) is around 4 and since a pH of the first fluid 218 is around 3, all dots within the first region are at a sub-4 pH and are red. Because all individual dots of the first region are individually red, a visible-eye color of the first region of image 160 is red;

(ii) within the second region of the multi-color ink-image 160, registration between droplets of the first and second fluid (i.e. performed by electronic circuitry 170—for example, controller 174 thereof) is employed to produce dots which are each individually blue. In particular registration between the deposition of droplets 268, 270 of the first 218 and second 220 fluids is employed so that droplets 270 of the second fluid 220 are deposited directly onto (i.e. overlay) dots formed from previously-deposited droplets 268 of the first fluid 218. This registration may be useful enable fast mixing between the first and second fluids and/or to control (or localize) such mixing, for example, to produce 'sharp' images.

FIG. 9 is a photograph of an example image produced in accordance with the non-limiting use case described above where the first fluid is FORMULATION_A (see below) and the second fluid is FORMULATION_B (see below). In the example of FIG. 9—the multi-color edible ink image 160 is printed onto on the beer foam (i.e. which is white or light-brown) has:

(i) four red regions (RGB 188, 1, 82) which are diagonally-oriented elongated rectangles (four corner) where only droplets of the first fluid (i.e. whose primary colorant is red cabbage juice or concentrate thereof or solids thereof) are deposited. In these regions, the dot-local pH at each dot (i.e. formed from the first fluid) is between around 3 and around 4, so the first fluid 218 remains red (i.e. about the same color as when the first fluid 218 is in its reservoir 198A);

(ii) two violet regions (RGB 190, 110, 184) which are each disposed vertically between red regions. In the violet regions, each dot is eventually violet. In particular, each dot in these regions is formed in two steps—first a droplet 268 of the first fluid 218 is deposited to form a red dot, and subsequently a droplet 270 of the second fluid 220 is deposited onto the red dot (i.e. overlay) to convert a color (i.e. by pH increase) of each red dot from red to violet.

(iii) three blue regions (RGB 91, 116, 198) that are horizontally aligned with each other to form a vertical line in the middle of the image. In the blue regions, each dot is eventually blue. In particular, each dot in these regions is formed in two steps—first a droplet 268 of the first fluid 218 is deposited to form a red dot, and subsequently two droplets 270 of the second fluid 220 is deposited onto the red dot (i.e. overlay) to convert a color (i.e. by pH increase) of each red dot from red to blue.

FIGS. 10A-10B and 11A-11D also relate to the example of FIG. 9 and are discussed below.

Before discussing FIGS. 10A-10B and 11A-11D, some potential design goals when producing an edible ink-image on edible substrate are now discussed, and the example formulation used to produce the multi-ink image of FIG. 9 are discussed.

Some Potential Design Goals when Producing an Edible Ink-Image on Edible Substrate In different embodiments, the multi-color image may produced on edible substrate (e.g. foam of a foamed beverage, or rice-paper, or yogurt or pudding) in accordance with one or more of the following goals, some of which may compete with each other:

A) producing the edible multi-color image without relying on inks comprising artificial colors (or relying inks including only certain 'permitted' artificial colors such as riboflavin or riboflavin phosphate); and/or B) producing the edible multi-color image using fluids which are ink-jettable (e.g. even after residing in an ink-jet pod for an extended period of time);

C) using inks (or in a printing-process) that are capable of producing a sharp image without droplet deflection and/or D) using edible fluids that are stable against microbial growth; and G) by using at most a "small" number of fluids (e.g. at most three or at most two) to form the multi-color image.

Example First Fluid 218 Formulation Used to Print the Multi-Color Image of FIG. 9

This formulation is referred to elsewhere in this disclosure as "FORMULATION_A."

The ingredients of this formulation are as follows:
(i) 51% wt/wt deionized water;
(ii) 25% wt/wt red cabbage concentrate (i.e. juice concentrate—i.e. concentrate of red cabbage juice) which has about 80% wt/wt water and about 20% wt/wt solids of red cabbage concentrate.
(iii) 20% wt/wt glycerol;
(iv) 4% wt/wt apple cider vinegar.

A mixture is formed from the DI water, red cabbage concentrate, glycerol and apple cider vinegar. The term 'juice' may refer to unfiltered juice or at least partly filtered juice.

The mixture is heated to 72° C. for 2 minutes, and subsequently cooled and filtered with 0.4 micron filter paper.

The "first fluid" formulation has the following properties:
(i) pH of 3.1;
(ii) color of the first fluid is red;
(iii) a 25° C. viscosity of about 3 centipoise (cP).
(iv) 525 nm optical density of 1.230 (525 nm 1-270 dilute
(v) Brix of 33.1;
(vi) upon raising the pH to about 6 with a clear solution of only DI water and sodium bicarbonate, a color of the first fluid becomes violet
(vi) upon raising the pH to about 7.5 with a clear solution of only DI water and sodium bicarbonate, a color of the first fluid becomes blu;
(vii) upon raising the pH to about 9 with a clear solution of only DI water and sodium bicarbonate, a color of the first fluid becomes green Optionally, a reservoir or chamber 198A of an ink-jet pod (e.g. thermal ink jet pod) is filled with the first fluid 198.

Example Second Fluid 220 Formulation Used to Print the Multi-Color Image of FIG. 9

This formulation is referred to elsewhere in this disclosure as "FORMULATION_B."

The ingredients of this formulation are as follows:
(i) 59.36% wt/wt deionized water;
(ii) 40% wt/wt glycerol
(iii) 0.6% wt/wt sodium bicarbonate.

A first mixture is formed from the DI water and the glycerol. Sodium bicarbonate is added to the mixture to raise the pH to about 8.4.

Figure 10:
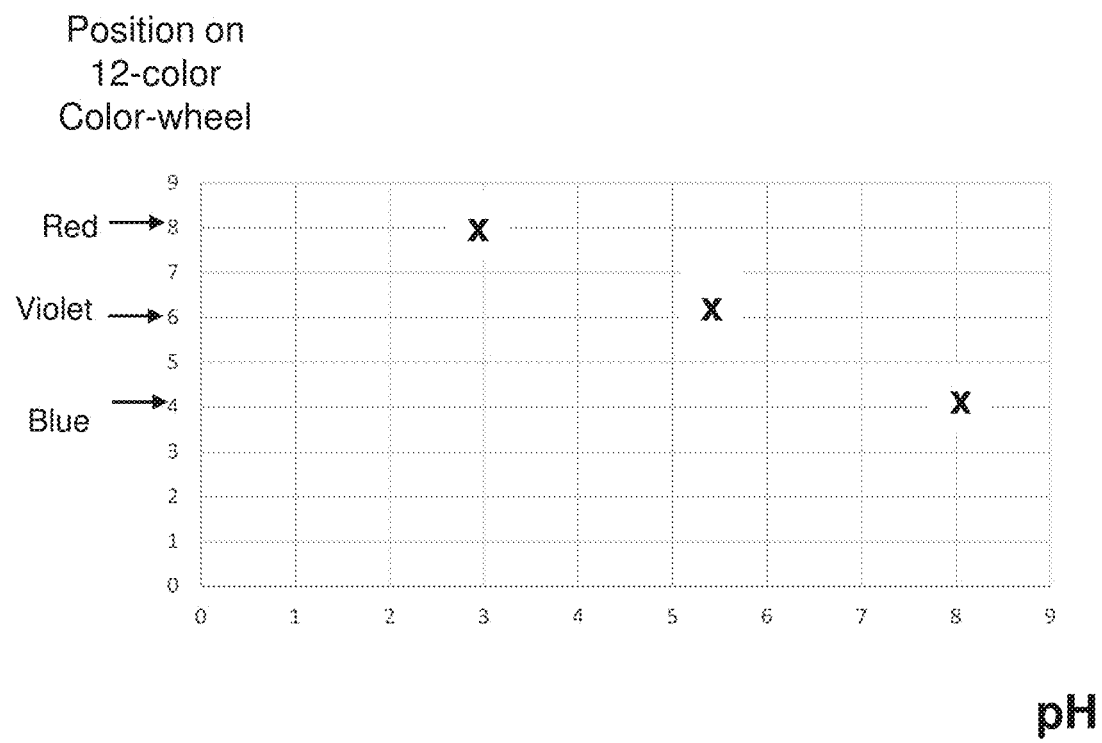

The mixture (i.e. an example of second fluid 220) has the following properties:
(i) a 25° C. viscosity of about 3-3.5 centipoise (cP);
(ii) a water activity $w_a$ of about 0.84;

FIG. 10—a pH-Color Dependency of the First Fluid

Figure 7A:
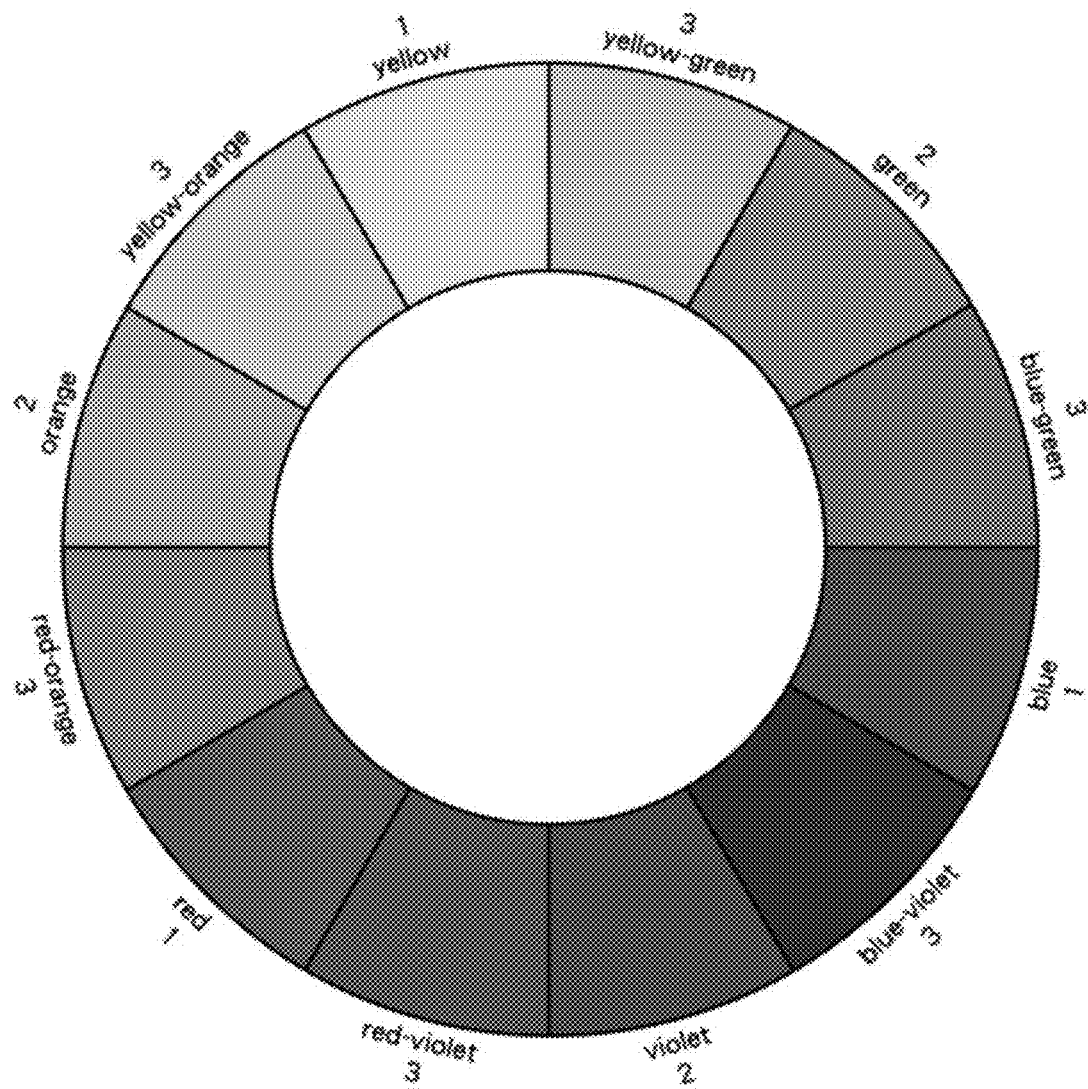

There are many numerical representation of color—e.g. LAB values, RGB values, or position on the 12-Color Color Wheel of FIG. 7B, where the 'position value' is an integer between 1 and 12.

FIG. 10 graphs a color of the first fluid 218 (i.e. ink) as a function of pH value. Only integer values appear on the y-axis. This describes a dependence the color of the first fluid (i.e. ink).

"Mixing Ratios" Describing Mixtures of (i) the Example First Fluid 218 and (ii) the Example Second Fluid 220

When the first 218 and second 220 fluids are mixed together, a 'mixing ratio' therebetween is a defined as a ratio between: (1) a mass of the second 220 fluid in the mixture and (ii) a mass of the first 218 fluid in the mixture.

A value of the 'mixing ratio' for the first 218 fluid (i.e. pure fluid without any of the second fluid 220 mixed in) is by definition 0.

Figure 11A:
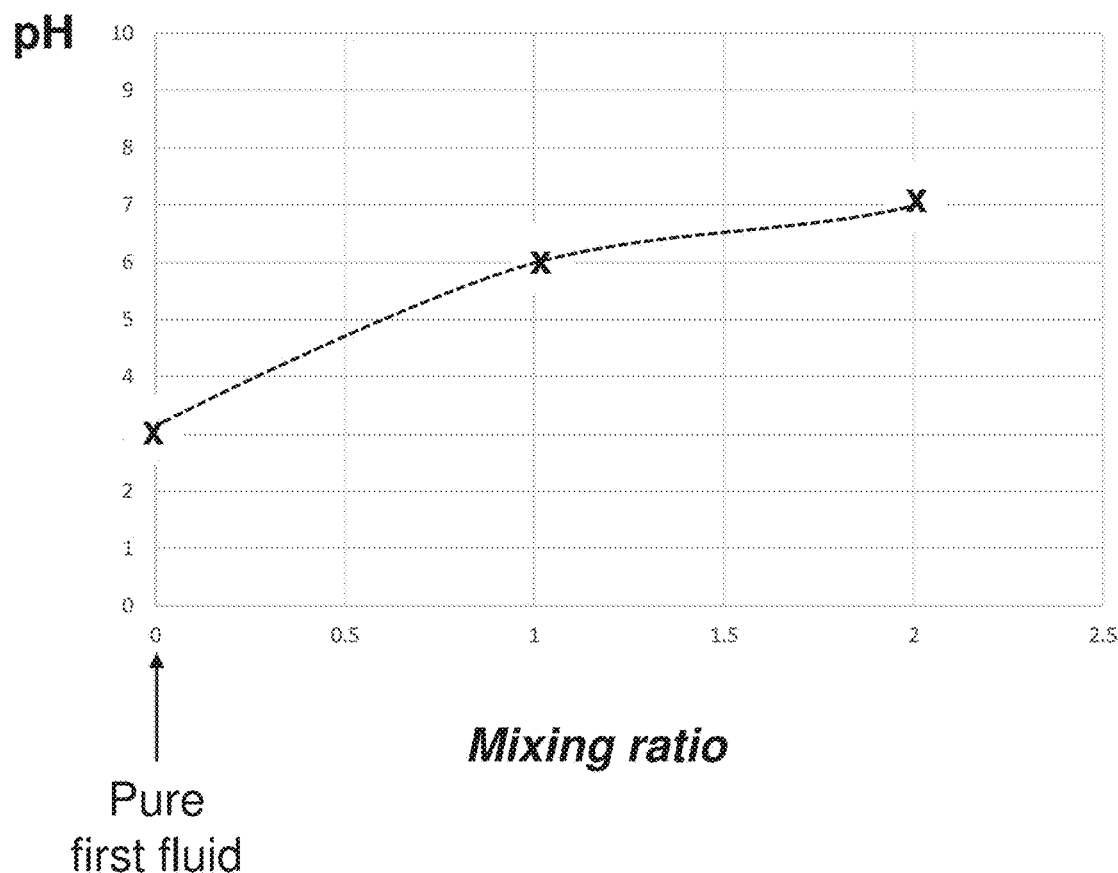
Figure 11B:
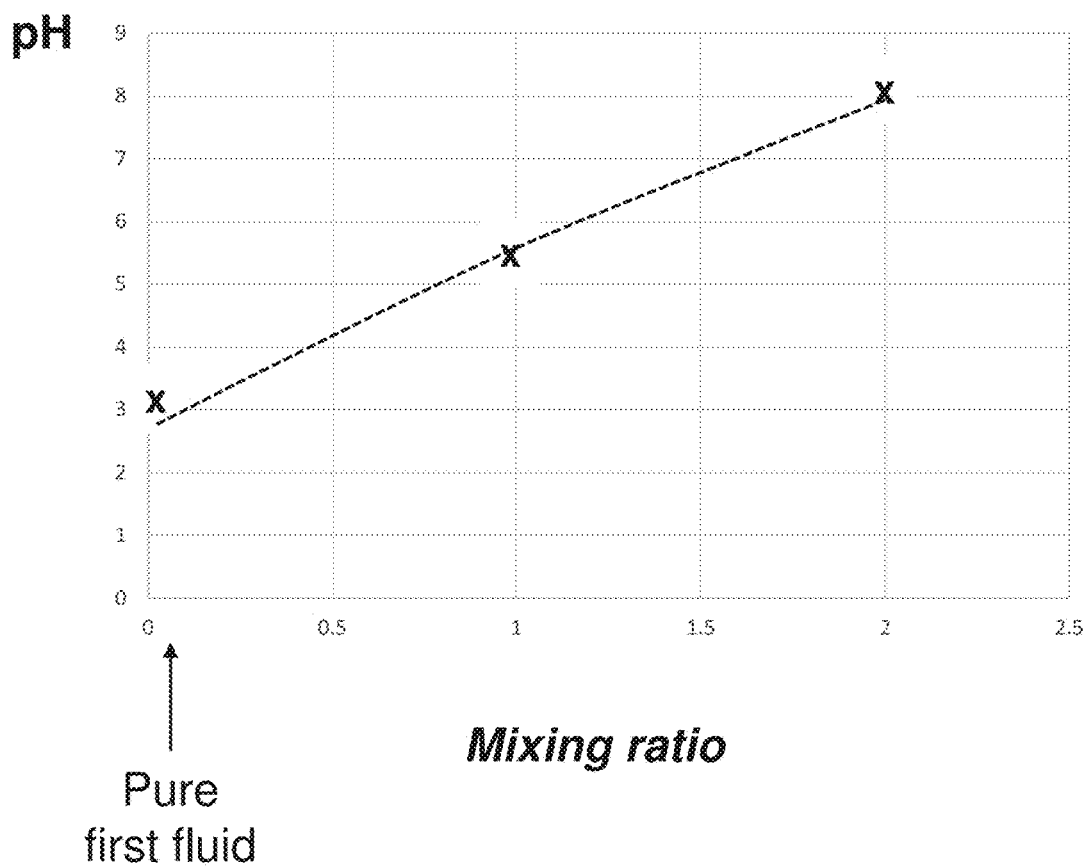
Figure 11C:
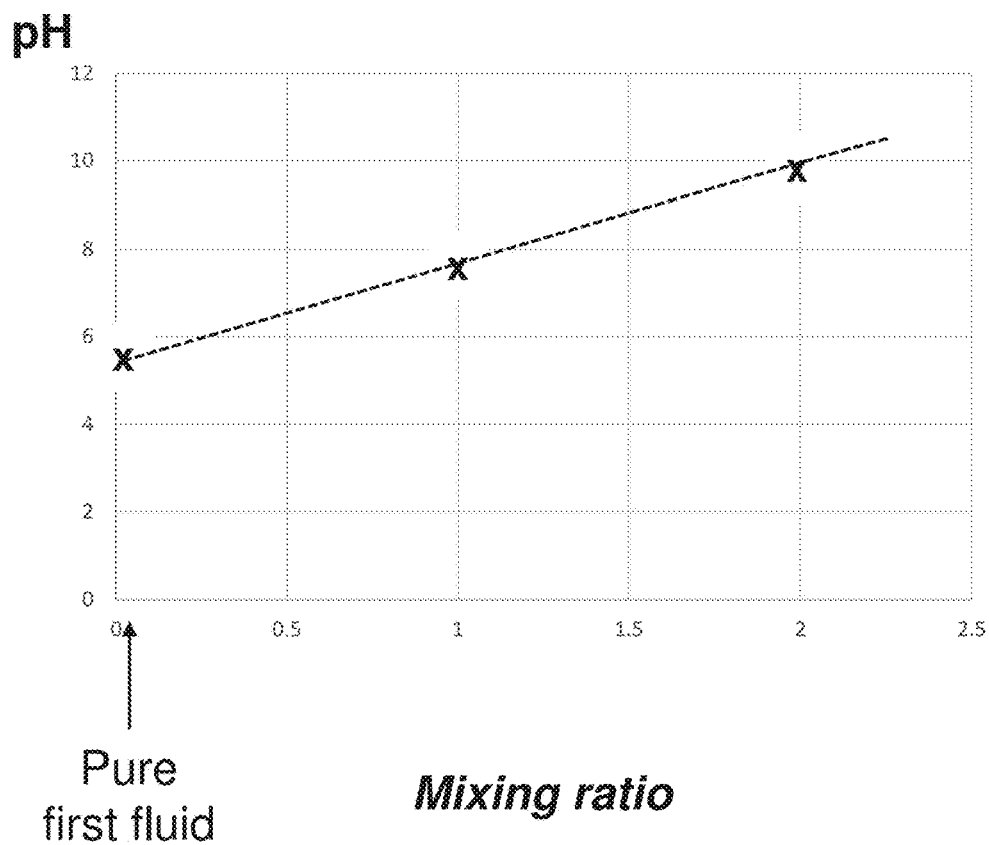

All of FIGS. 11A-11C relate to mixtures of: (i) the example First Fluid 218 Formulation Used to Print the Multi-Color Image of FIG. 9 (see above); and (ii) the example Second Fluid 220 Formulation Used to Print the Multi-Color Image of FIG. 9 (see above).

In one example, a single droplet of the first fluid 218 and a single droplet of the second fluid 220 are deposited to a common location (droplets have the same mass)—in this case, the mixing ratio is 1/1=1. In another example, a single droplet of the first fluid 218 and a two droplets of the second fluid 220 are deposited to a common location (all droplets have the same mass)—in this case, the mixing ratio is 2/1=1.

As stated above, a pH of the example First Fluid 218 Formulation Used to Print the Multi-Color Image of FIG. 9 is 3.1—as such, in FIG. 11A, a value of pH for mixing ratio=0, is 3.1.

FIG. 11A shows a pH: mixing ratio dependency the example First Fluid 218 Formulation Used to Print the Multi-Color Image of FIG. 9 (see above)—FORMULATION_A; and (ii) the example Second Fluid 220 Formulation Used to Print the Multi-Color Image of FIG. 9 (see above)—FORMULATION_B.

FIG. 11A relates to mixing the fluids, for example, under 'standard conditions,' where at least 20 ml of each fluid is provided in a small beaker or a test-tube.

FIGS. 11B-11C are now discussed.

When two different fluids are mixed with each other, the pH of the mixture may depend upon the environment where they are mixed with each other.

For example, when droplets of the two different fluids are mixed with each other and the mixing occurs on a substrate (i.e. on a surface of the substrate), the pH of the mixture of droplets may depend on pH of the substrate where the mixing occurs. Furthermore, the pH of the resulting mixture might depend on additional properties of the substrate's—for example, whether or not the surface is solid or liquid or foam (and a type of gas of the foam). Alternatively or additionally, thereof or might depend other the absolute volume of each fluid to be mixed (e.g. small droplets might be subject to greater evaporation than larger droplets, and if the vapor pressure of one fluid whose pH is a first value differs from a vapor pressure of the second fluid).

The present inventor has performed experiments where droplets (e.g. having a volume of about 45 pico-liters) of the deposited, by ink-jetting, onto a common location for two types of foamed surfaces—(i) a beer surface whose pH is 4 and (ii) a milk surface whose pH is 8.

To obtain a 'mixing ratio' of 0, only a single droplet was deposited (i.e. of the first fluid). To obtain a 'mixing ratio' of 1, a single droplet of the first fluid and a single droplet of the second fluid were deposited to a common location (i.e. droplet overlay)—this common location was the upper surface of a foamed beverage. To obtain a 'mixing ratio' of 2, a single droplet of the first fluid and two droplets of the second fluid were deposited to a common location (i.e. droplet overlay)—this common location was the upper surface of a foamed beverage.

pH was measured using a surface pH meter MRC-MP-103 Flat surface Ph electrode—i.e. an electrode of the surface pH meter was put into contact with the droplet/fluid mixture.

The results (once again, for FORMULATION_A and FORMULATION_B) are shown in FIGS. 11B-11C. Comparing the two graphs, the following may be observed: (i) the pH values are generally higher when the droplets are mixed on an alkaline surface (i.e. foamed milk at pH of 8—see FIG. 11C) than when the droplets are mixed on an acidic surface (i.e. beer at pH of 4).

One note about FIG. 11C—for a mixing ratio of 2, a pH value is 9, corresponding to blue-green for FORMULATION_A. This pH value exceeds (i) a pH of FORMULATION_A (about 3), which is acidic; (ii) a pH of the milk surface (around 8) and (iii) a pH of FORMULATION_B (about 7.6).

Not wishing to be bound by theory, the inventor believes that this surprisingly high pH value is achievable due to a chemical and/or physical process which occurs in the foam disposed on the top of a milk-beverage.

A Discussion of FIGS. 12A-12D and 13A-1B

FIGS. 12A-12D relate to FIGS. 9 and 11B.

FIG. 9, discussed above, is a photograph of a multi-color edible ink image printed onto beer foam. As discussed above, this multi-color edible ink image includes red, violet and blue regions.

These red 360A-360D, violet 364A-364B, and blue 368A-368C regions of the edible ink-image are illustrated in FIGS. 12A-12D.

In order to generate the edible ink-image of FIG. 9, fluids 218, 220 from reservoirs 198A, 198B are deposited, by ink-jet, onto the target substrate (i.e. foamed surface of beer). In particular, registration between deposition of droplets of the first and second fluids may be performed so that droplets(s) 268 of the second fluid 218 are deposited (i.e. overlay) onto previously-deposited droplets 270 of the first fluid 220 (or vice versa).

Referring to the table of FIG. 12A, in the background locations, only beer foam is present, a pH is 4, and the color is white or light brown.

Figure 12B:
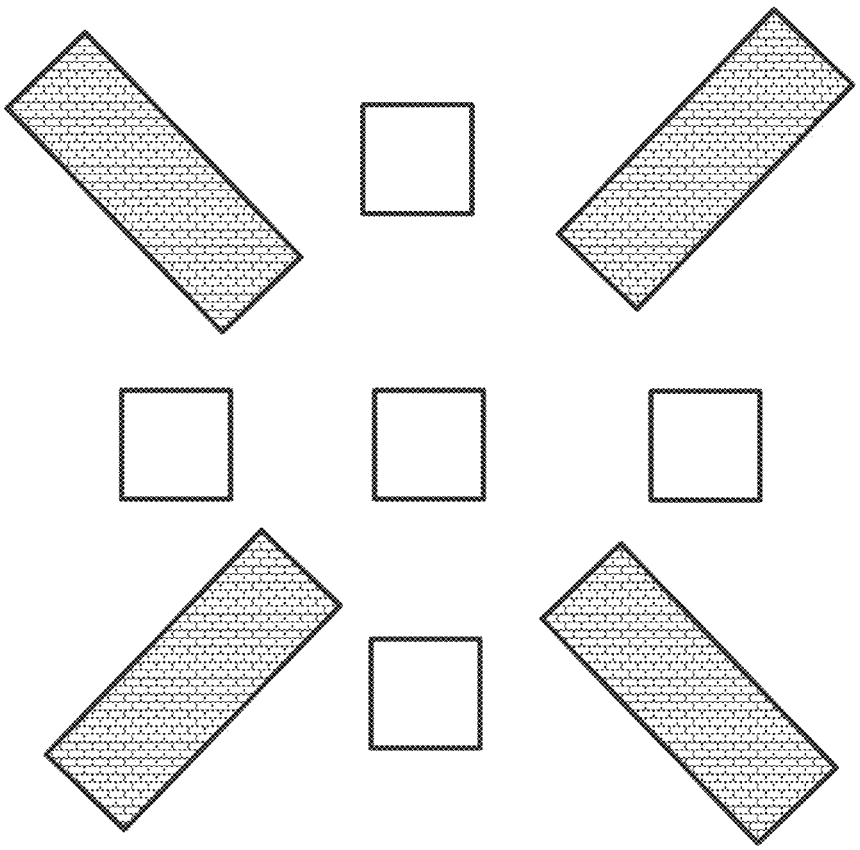

Within each of the red locations 360A-360D, only droplets of the first fluid are ink-jetted onto the beer foam to form a plurality of ink-dots thereon. The color (i.e. red) of each of the ink-dots within regions 360A-360D (all red) is determined by a combination of: (i) "pH:Mixing-ratio dependency of pH upon a mixing ratio between the first and second fluids on beer foam" of FIG. 11B for the mixing ratio=0 (i.e. pH of around 3) and (ii) the pH-color dependency of the first fluid of FIG. 10 (i.e. red based on a pH of 3). It is possible to obtain a lighter shade of red (i.e. to change the shade in the regions 360A-360D without changing the dot-colors) by reducing the density of dots—i.e. so that coverage with the first fluid 218 is less than 100%. This is also illustrated in FIG. 12B.

Within each of the violet locations 364A-364B, droplets of both the first and second fluids are ink-jetted onto the beer foam to form a plurality of ink-dots thereon. The color (i.e. red) of each of the ink-dots within regions 364A-364B (all red) is determined by a combination of: (i) "pH:Mixing-ratio dependency of pH upon a mixing ratio between the first and second fluids on beer foam" of FIG. 11B for the mixing ratio=1 (i.e. pH of around 5.5) and (ii) the pH-color dependency of the first fluid of FIG. 10 (i.e. violet based on a pH of 5.5). It is possible to obtain a lighter shade of violet (i.e. to change the shade in the regions 364A-364B without changing the dot-colors) by reducing the density of dots— i.e. so that coverage with the first fluid 218 is less than 100%. This is also illustrated in FIG. 12C.

Within each of the blue locations 368A-368C, droplets of both the first and second fluids are ink-jetted onto the beer foam to form a plurality of ink-dots thereon. The color (i.e. red) of each of the ink-dots within regions 364A-364B (all red) is determined by a combination of: (i) "pH:Mixing-ratio dependency of pH upon a mixing ratio between the first and second fluids on beer foam" of FIG. 11B for the mixing ratio=2 (i.e. pH of around 8) and (ii) the pH-color dependency of the first fluid of FIG. 10 (i.e. violet blue on a pH of 8). It is possible to obtain a lighter shade of blue (i.e. to change the shade in the regions 368A-368C without changing the dot-colors) by reducing the density of dots—i.e. so that coverage with the first fluid 218 is less than 100%. This is also illustrated in FIG. 12D.

Multi-Color Directives, Targeting Colors, and Providing Additional Shades—a Discussion of FIGS. 13A-13B, 14A-14B and 16A-16B Embodiments of the present invention relate to methods and apparatus for creating specific color patterns where multiple colors of the may be 'targeted'—i.e. to enforce a 'multi-color directive' that requires the targeting of multiple and different colors for appearance in an ink-image. One example of a multi-color directive may relate to a greyscale image of a garden next to a house—the flowers in the garden (e.g. which may be digitally marked or identifiable by image-processing techniques) may be 'targeted' to red, the grass to green, and the sky to blue.

When a color of an ink image is 'targeted' for the ink-image (e.g. in the context of a multi-color directive), this refers to one of (A) printing relative quantities or locations of each fluid of a plurality of fluids (e.g. first 218 and second 220 fluids) so that the 'targeted' color appears in the ink-image (OPTION A) or (B) regulating droplet-deposition of relative quantities or locations of first and second fluid so as to minimize a color-difference between:
  (i) a color achievable for the color gamut available for plurality of fluids; and
  (ii) a color (e.g. ink-dot color) that is 'targeted' to appear in the ink image (OPTION B).

Briefly, for Option A, this means targeting 'achieves the goal" and for Option B, this means targeting 'gets as close a possible to achieving the goal.' This may apply to colors of ink-dots or colors of a region (e.g. containing ink-dots).

In the prior art, such a directive (i.e. to achieve specific dot-colors) would be enforced by the right combination of cyan, magenta, yellow, and key (black)—i.e. droplets multiple colorants (e.g. dyes) would be delivered to a common pixel-locations (i.e. using overlay to form secondary colorants) and/or enforced using halftoning techniques.

In contrast, in embodiments of the invention, it is possible to produce an ink-image using a single dye-molecule (i.e. anthocyanin—as provided, for example, by red-cabbage extract or extract of any other anthocyanin-containing plant (s)) whose color depends on pH (e.g. red for the acidic form of the dye-molecule, and blue or green of the basic form thereof.

One way of 'targeting a color' is by first generating (e.g. by a digital computer or any other electronic circuitry and/or executing software code) digital images (i.e. stored in computer memory) in accordance with a combination of pH-related factors, and then printing these digital images (e.g. a first digital image is printed in B/W using the first fluid, and a second digital image is printed in B/W, according to registration techniques for droplet-overlay, using the second fluid).

The combination of pH-related factors may be the following combination:
  (I) a "multi-color directive" (e.g. a requirement to target both red and blue to appear in the ink-image—other example are provided below) to be enforced;
  (II) a pH-color dependency of the first fluid 218 (see, for example, FIG. 10); and
  (III) a pH:mixing-ratio dependency of a pH (i.e. a predicted pH) upon mixing ratio between the first and second fluids. Such a prediction could be made, for example, in accordance with the curve of FIG. 11A. For greater accuracy, the properties of the target substrate may be taken into account, —e.g. using the curve of FIG. 11B (for beer foam) or FIG. 11C (for milk foam).

In one example related to FIG. 9 and FIGS. 12A-12D, a black-and-white version of the image of FIGS. 9 and 12A is received into computer memory for an ink-jet printer, and there is a multi-color directive (e.g. represented as computer data) to "colorize" this black-and-white version as follows: (i) diagonally oriented rectangles (360A-360D) are to be printed in red (i.e. red is targeted); (ii) the 3 out of 5 squares disposed in a vertical line (368A-368C) are to be printed in blue (i.e. blue is targeted); and (iii) the remaining two squares are to be printed in violet (i.e. violet is targeted).

Figure 13A:
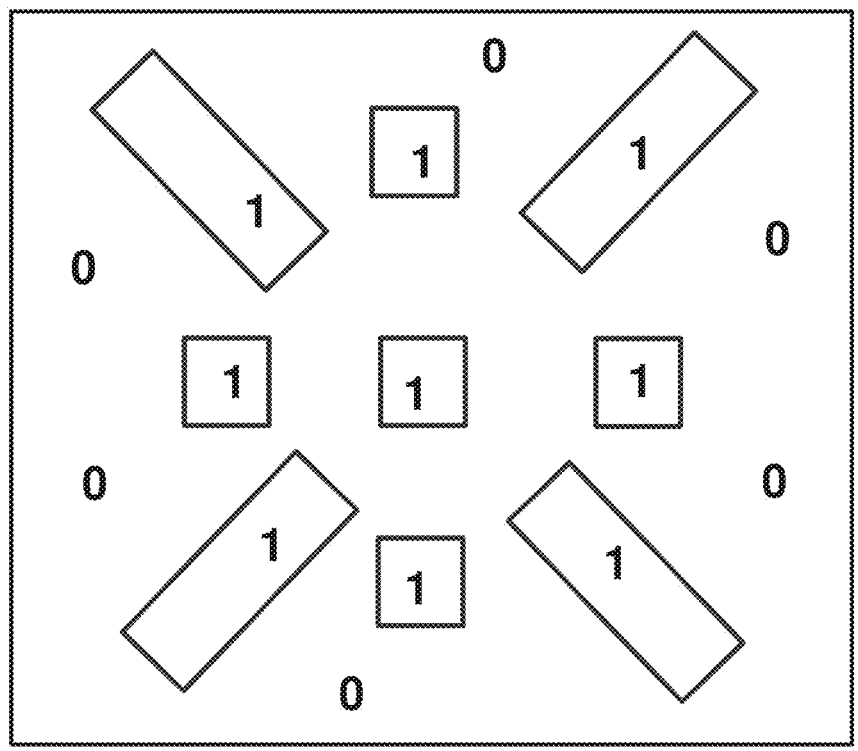
Figure 13B:
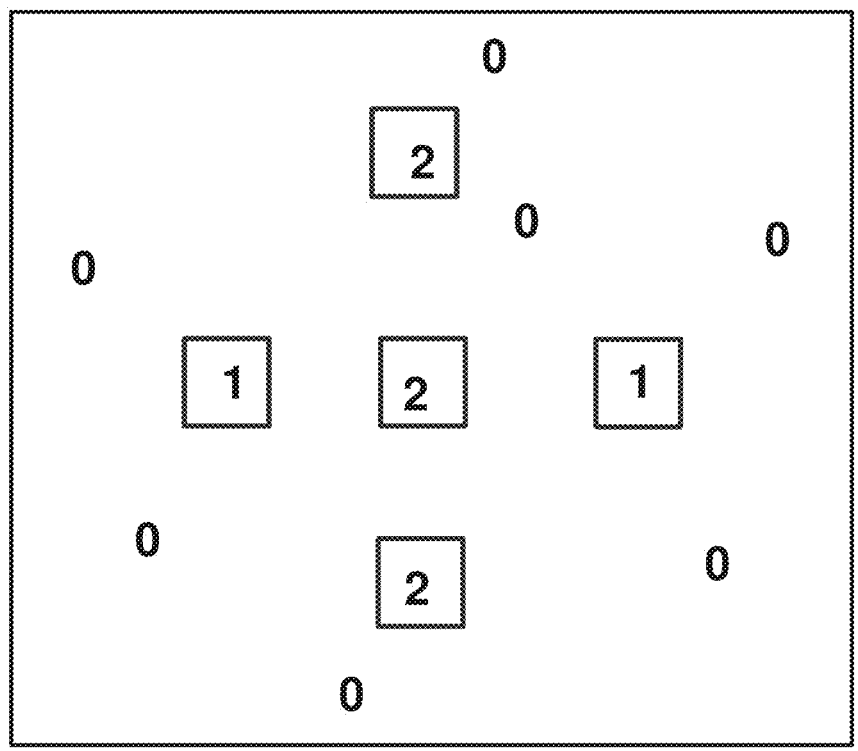

This multi-color directive may be enforced by generating the two digital images of FIGS. 13A-13B—the first digital image (see FIG. 13A) is printed by depositing droplets of the first fluid 218, and the second digital image (see FIG. 13B) is subsequently printed by depositing droplets of the second fluid 220. Collectively, these digital images specify the mixing ratios for achieving the multi-color directive described above.

This set of two digital images (i.e see FIGS. 13A and 13B) are generated to enforce the multi-color directive, and are so generated in accordance with the combination of: a pH-color dependency of the first fluid 218; and pH:mixing-ratio dependency of a pH (i.e. a predicted pH) upon mixing ratio between the first and second fluids.

Other non-limiting example of multi-color printing directives include: (i) a directive to reproduce a multi-color digital image (e.g. a photograph received as a digital image) with the best possible color fidelity possible for a color gamut of the plurality of fluids (e.g. 218 and 220) where the multi-color digital image includes both red and blue pixels and/or includes both red and green pixels and/or includes both violet and green pixels); and (ii) a directive to print a grayscale image where the upper and left 25% of the digital image is printed only to produce (i.e. in the corresponding ink-image) ink-dots only of a first color (e.g. red), the upper and right 25% of digital image is printed to produce (i.e. in the corresponding ink-image) ink-dots only of a second color (e.g. blue); (iii) and the bottom 50% of the digital image is printed only to produce (i.e. in the corresponding ink-image) ink-dots only of a third color (e.g. green).

FIGS. 14A-14B are methods of printing. FIG. 14A includes steps S101 and S109 and FIG. 14B includes steps S101, S109, and S1217. In steps S109 and S117 it is understood that for greater accuracy, a pH:mixing ratio dependency that is "customized" for the target surface (e.g. rice-paper or beer foam or milk foam or foam of cocktails—for example, comprising a mixture of egg-whites and lemon juice).

Figure 15:
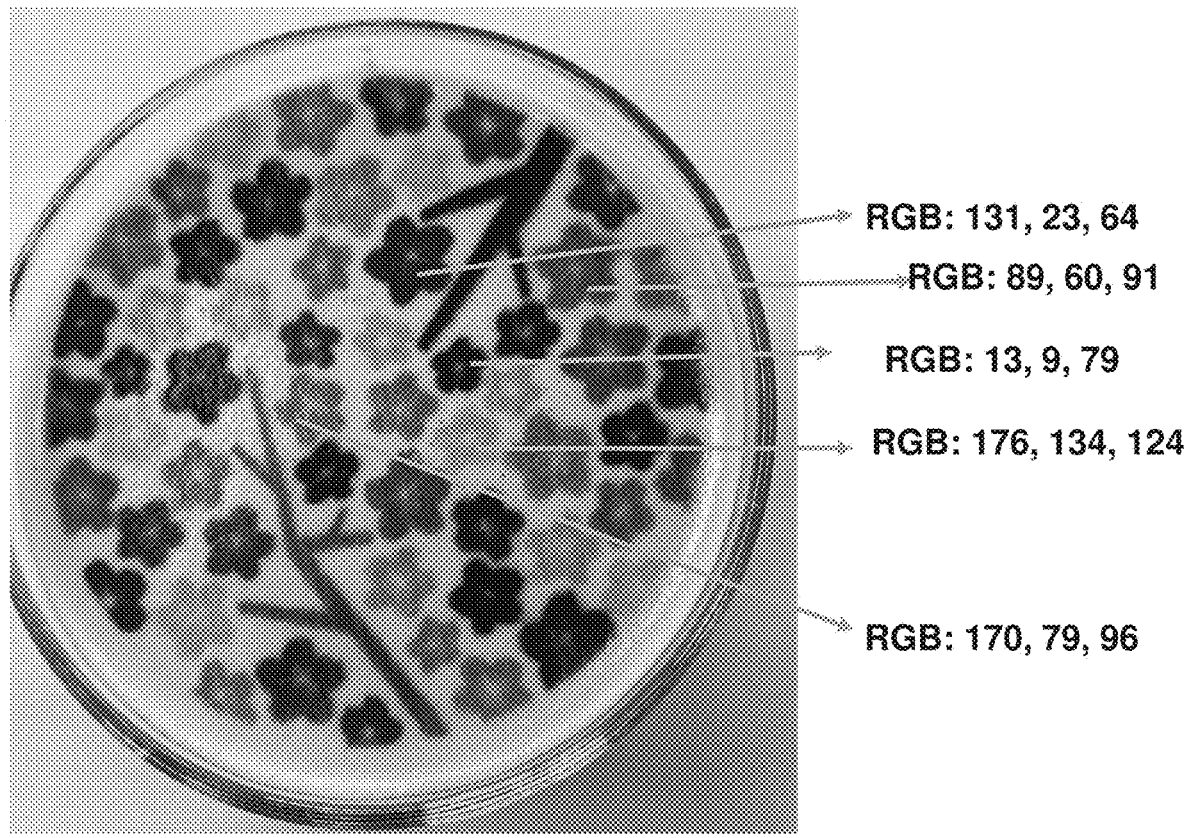
Figure 16A:
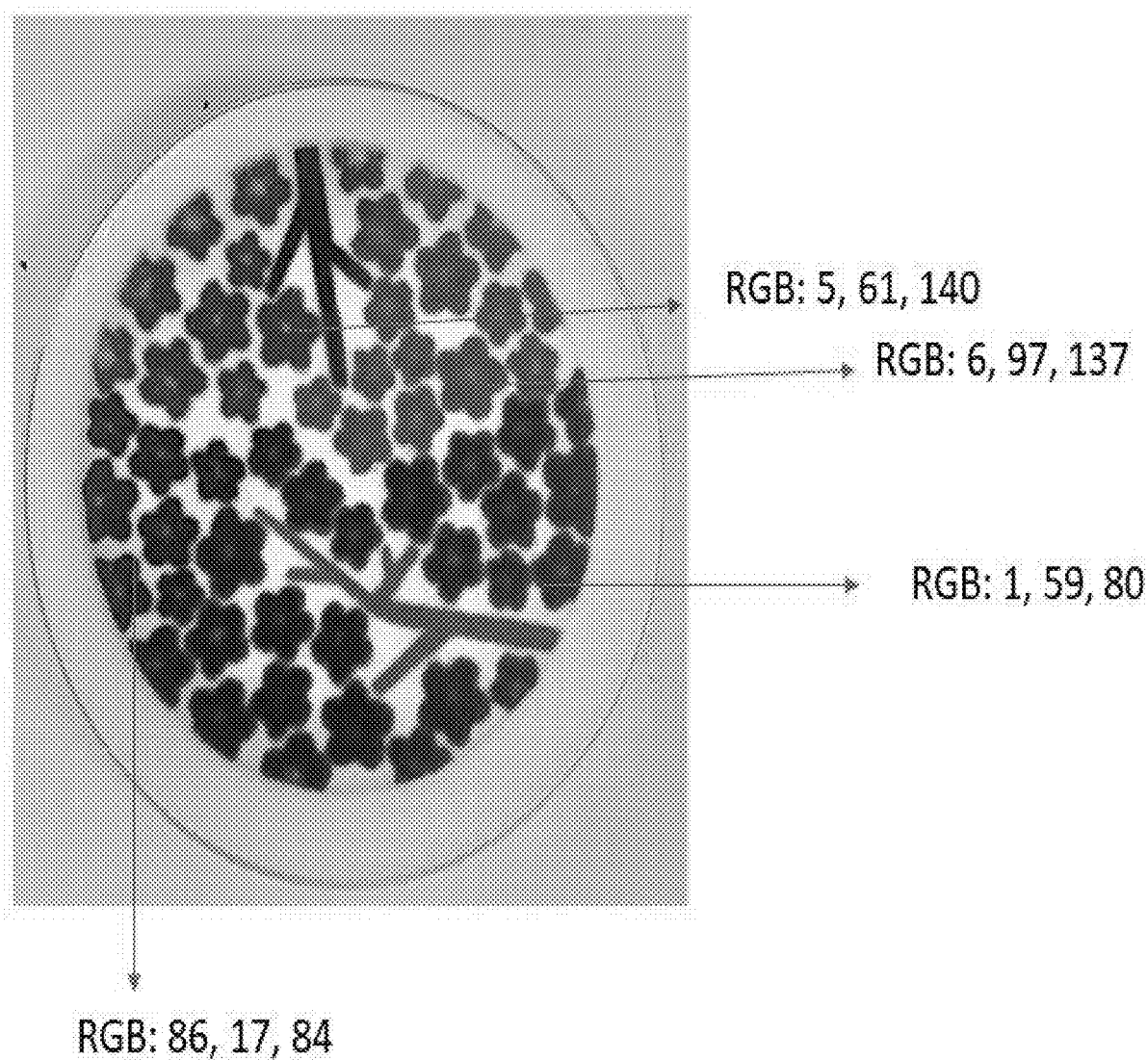
Figure 16B:
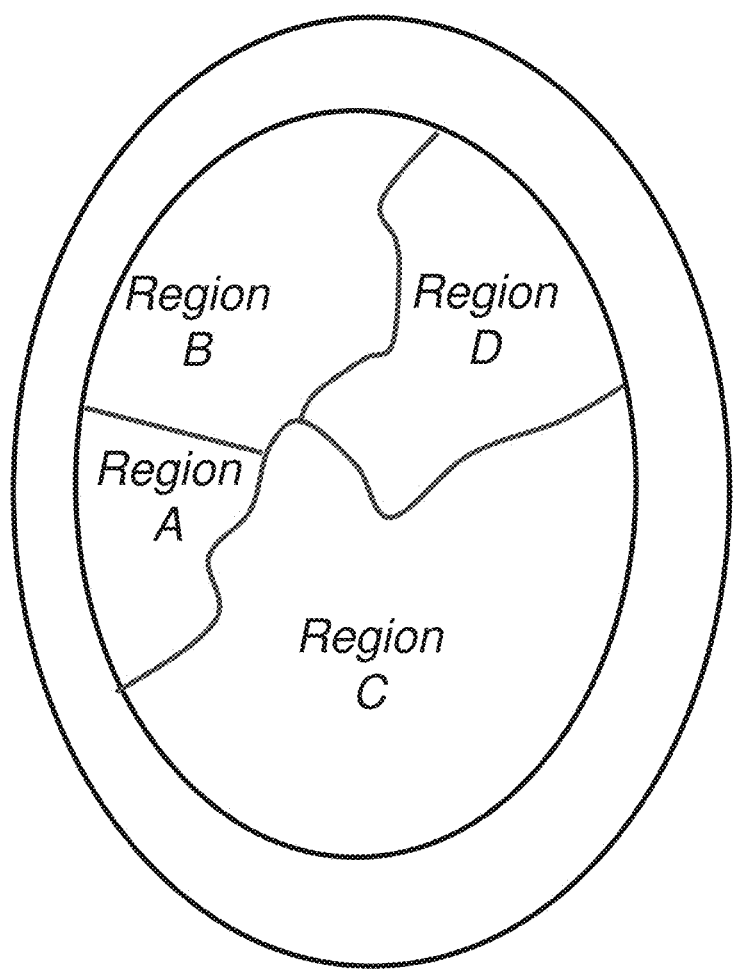
FIG. 16B shows areas of FIG. 16A.

FIG. 15 is another example using printing the same first and second fluids, both onto beer surface. In contrast to the image of FIG. 9 where all of regions 360A-360, 364A-364B, and 368A-368C are printed at a 100% droplet-pixel coverage (i.e. for the first fluid), in the example of FIG. 15 it is possible to increase the number of shades available by varying droplet-pixel coverage—e.g. to obtaining lighter shades of red (which might appear pink) with lower coverage FIG. 16A is a photogram of an multi-color ink-image printed on milk foam, whose pH is 8. The image of FIG. 16A including purple, blue and green sections, and was printed using the arrangement of FIGS. 8A-8B.

Figure 17A:
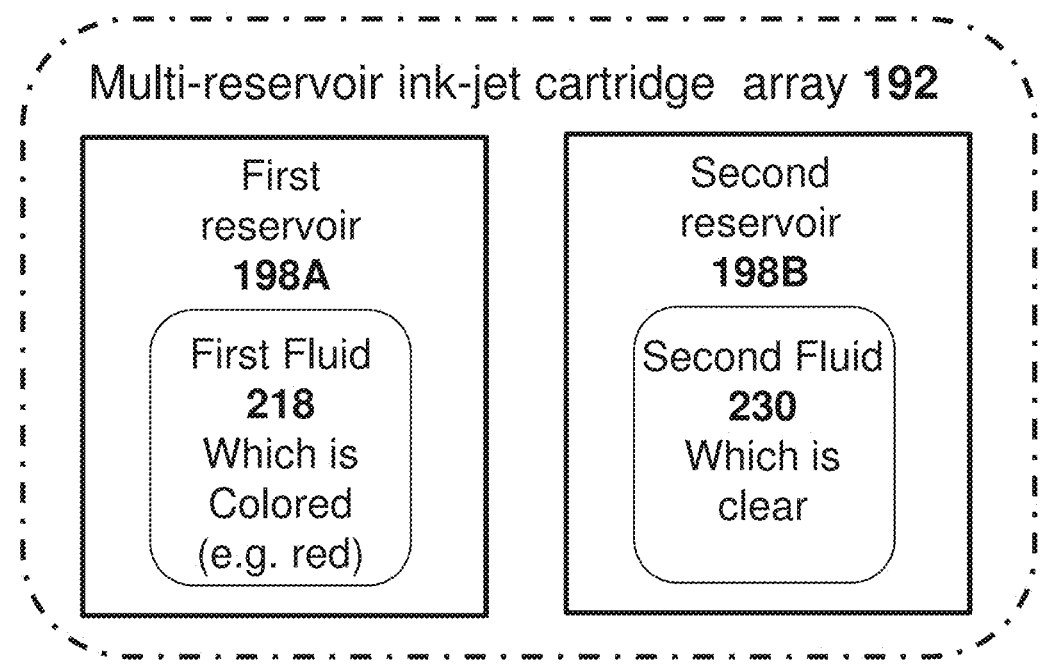

NOTE—for the example of FIG. 9, the curve of FIG. 11B (specific for beer foam) was an improvement upon the curve of FIG. 11A. For the example of FIG. 16A-16B, the curve of FIG. 11C (specific for milk foam) in an improvement upon the curve of FIG. 11A In one non-limiting example, the image of FIG. 16A may be printed on milk-foam as follows:
(i) first, a greyscale digital-image version of the photograph of FIG. 17A is ink-jet printed (i.e. to produce an "intermediate image) by depositing droplets 268 of the first fluid 218 onto the milk-foam. At this time, all ink-dots of ink-image of this intermediate image are violet, based on FIG. 11C which shows a pH of almost 6 and FIG. 10 which shows the violet color. Ink-dots of this first image should all have the same pH—i.e. this ink-image is pH-homogeneous with respect to its ink-dots. Because the digital image is grey-scale (and not just binary), a coverage fraction in region C is greater than in region D, and region C is a darker shade.
(ii) subsequently, a color-profile of this intermediate ink-image is modified by modifying a pH profile thereof to produce a pH heterogenous (i.e. with respect to its ink-dots) image. In the example of FIG. 17A this may be done as follows—within Regions C and D, two droplets 280 of the second fluid 220 are deposited onto (i.e. overlay) violet ink-dots of the intermediate ink-image (e.g. so that a mixing ratio for pixel/ink-dot locations is 2:1) to convert the violet ink-dots into green ink-dots. Within region B, only one droplet 280 of the second fluid 220 are deposited onto (i.e. overlay) violet ink-dots of the intermediate ink-image (e.g. so that a mixing ratio for pixel/ink-dot locations is 2:1) to convert the violet ink-dots into blue ink-dots.

Note—this order for which droplets are deposited is provided in some embodiments, but it not limiting overall—in other examples, droplets of the second fluid may be deposited before droplets of the second fluid (e.g. to overlay them), or there is no requirement to print an entire image using one fluid before overlaying using the other fluid.

Figure 17B:
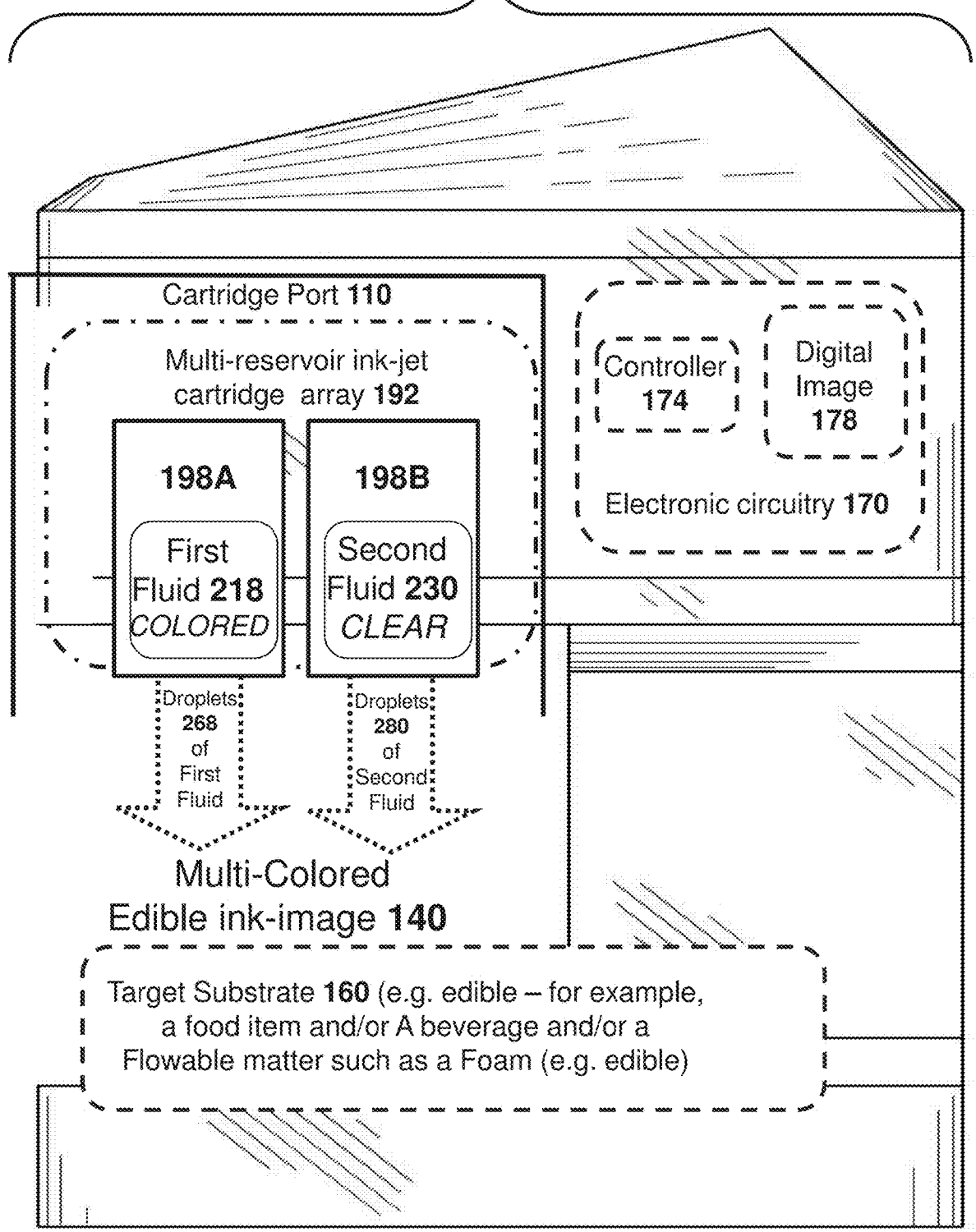

FIGS. 17A-17B—an Alternative to FIGS. 8A-8B where the Second Fluid is not Necessarily Basic Not wishing to be bound by theory, it is now disclosed that the embodiments of FIGS. 8A-8B are useful for situations where it is desired to print an edible ink-image on edible substrate (i) that includes specific color-combinations (e.g. an ink-image including both red and blue pixels and/or includes both red and green pixels and/or includes both violet and green pixels) and (ii) in a manner that avoids as much as possible (e.g. completely), the use of artificial colorants and while relying on natural colorants.

The inventor has found that inks based on anthocyanins-containing plant concentrate (e.g. red cabbage concentrate) is useful as a first fluid 218. In the example of FIGS. 8A-8B, 9, 11B and 12A-12D, the target substrate is acidic. In order to convert the red color of the anthocyanins-containing plant concentrate into blue or green (e.g. to produce an ink-image including both red and blue and/or both red and green), the inks based on anthocyanins-containing plant concentrate is mixed in situ (i.e. on the surface) with droplets of a base fluid, as the second fluid 220. This is because droplets of the first fluid would not reach the request pH to produce blue and/or green without being mixed with a fluid of higher pH.

When printing on a surface (e g milk-foam) that is alkaline, an alternative approach may be adopted (or combined with the previous approach).

Review of FIGS. 10 and 11C shows that for a mixing ratio of "zero", a pH of the first fluid is about 5.5 and a color thereof is violet or red-violet. Thus, even though the ink itself is red, it would be challenging or impossible to obtain red-dots on the milk-foam surface using only the arrangements of FIG. 8A-8B.

FIGS. 17A-17B provide an alternative. Instead (or in addition to) of ink-jetting droplets of a clear base fluid 220 (see FIG. 8A), the purpose of which is to raise the pH of the first fluid and to modify a color thereof (e.g. by modifying, in situ, a pH of droplets of the first fluid or an ink-dot thereof) in a counterclockwise direction in the 12-Color Color-wheel of FIGS. 7A-7B (e.g. from red to violet, or from red to blue, or from red to green), in the example of FIGS. 17A-17B, instead of using a clear base fluid 220, a clear acid fluid 230 is used to modify pH instead.

One example formulation for the ink-jettable acid fluid 230 is Formulation_F, described below.

Figure 18:

This formulation Formulation_F, together with the arrangements of FIGS. 17A-17B was used to print on a milk surface to produce the ink-image whose photograph is shown in FIG. 18.

Figure 19:
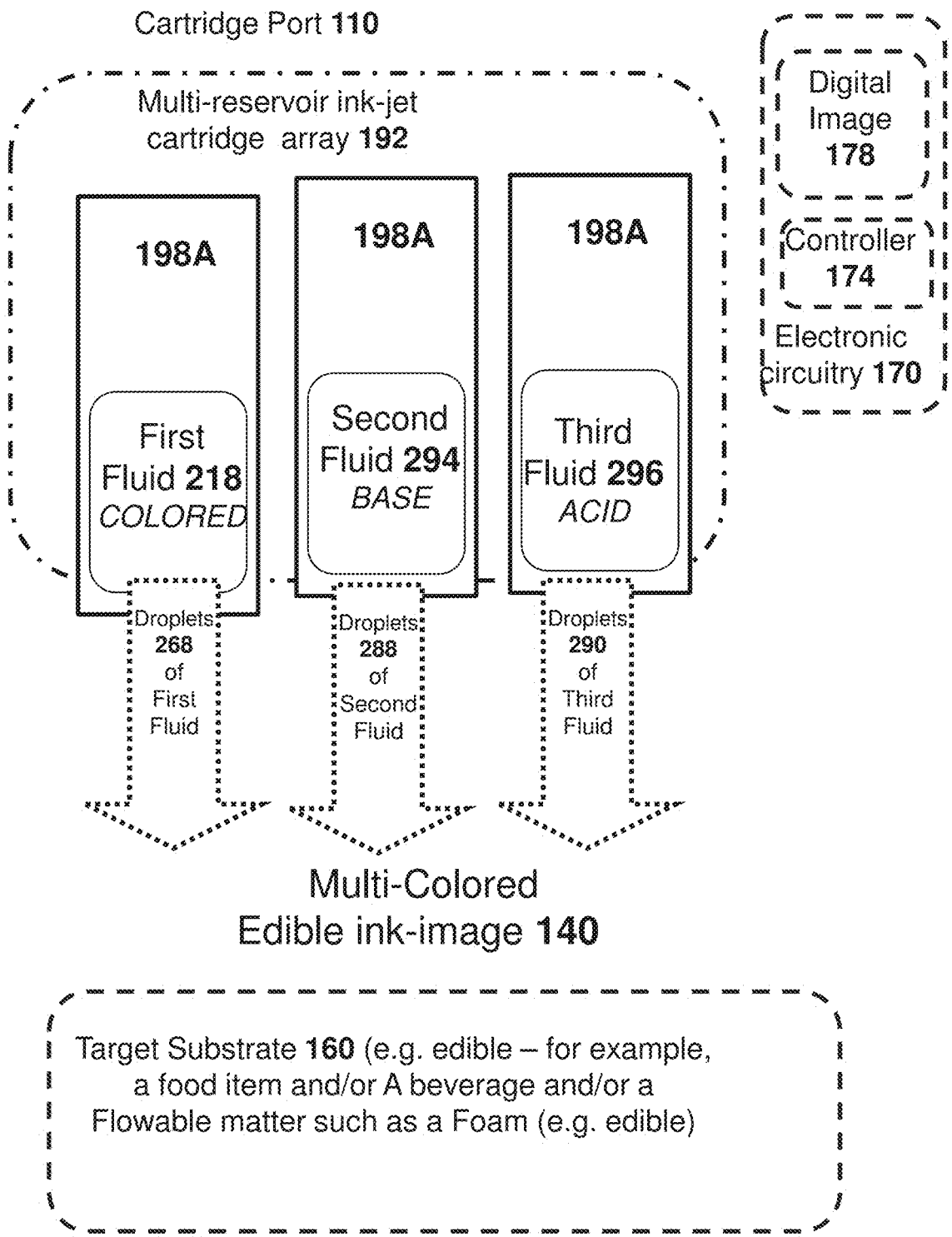

The concepts of FIGS. 8A-8B and 17A-17B may be combined—see, for example, FIG. 19.

Thus, in some embodiments, the formation of a multi-color image may comprise:
(i) forming some ink-dots from a mixture of the first fluid 218 and a second fluid 220 (i.e. a base); and
(ii) forming other ink-dots from a mixture of the first fluid 218 and a third fluid 230 (i.e. the acid).

These (3 or more reservoir) embodiments may be useful for increasing a color-gamut.

A Discussion of FIGS. 20, 21A-21B, 22

In some embodiments, the arrangement of FIGS. 8A-8B may be modified so that second fluid 220 is not necessarily clear. For example, riboflavin phosphate may be a colorant or a primary colorant or the sole colorant of the second fluid 220—see, for example, Formulation_E described below.

Similar modifications may be made to second fluid 230 (acid).

In some embodiments, even if second fluid 220 is not "clear", it may be "clear enough" in a manner that is defined relative to the first fluid.

For example, the first fluid 218 and the second fluid 220 (or 230) may be such that when mixed together at a X:Y ratio (by mass—i.e. X grams of the first fluid 218 mixed with Y grams of the second fluid 220 (or 230 or the version of the second fluid that is not necessarily clear—e.g. having riboflavin or riboflavin phosphate)—1:1 ratio may also be written as a 50:50 ratio) of, a primary colorant of the first fluid is also a primary colorant of the X:Y mixture (this may be true for (X=1, Y=1) and/or for (X=1, Y=2)). In one example, (i) the first fluid is an acidic edible and aqueous ink, a primary colorant of the first fluid is an extract of plant matter or solids of the extract of the plant matter; and (ii) a primary colorant of the X:Y (e.g. X=1, Y=1 or X=1, Y=2) mixture of the first and second fluid 220 (or 230) is the extract of plant matter or solids of the extract of the plant matter. In another example, a primary colorant of both the first fluid and the X:Y (e.g. X=1, Y=1, or X=1, Y=2) mixture is selected from the group consisting of: i. anthocyanin-containing extract of anthocyanin-containing plant matter (ACE-ACPM), or solids of the ACE-ACPM; ii. Betanin-containing extract of Betanin-containing plant matter, or solids of the ACE-ACPM; and iii. combinations thereof.

In another example, a primary colorant of both the first fluid and the X:Y (e.g. X=1, Y=1, or X=1, Y=2) mixture is anthocyanin. In another example, a primary colorant of both the first fluid and the X:Y (e.g. X=1, Y=1, or X=1, Y=2) mixture is the anthocyanin-containing extract of anthocyanin-containing plant matter (ACE-ACPM), or solids of the ACE-ACPM.

Figure 20:
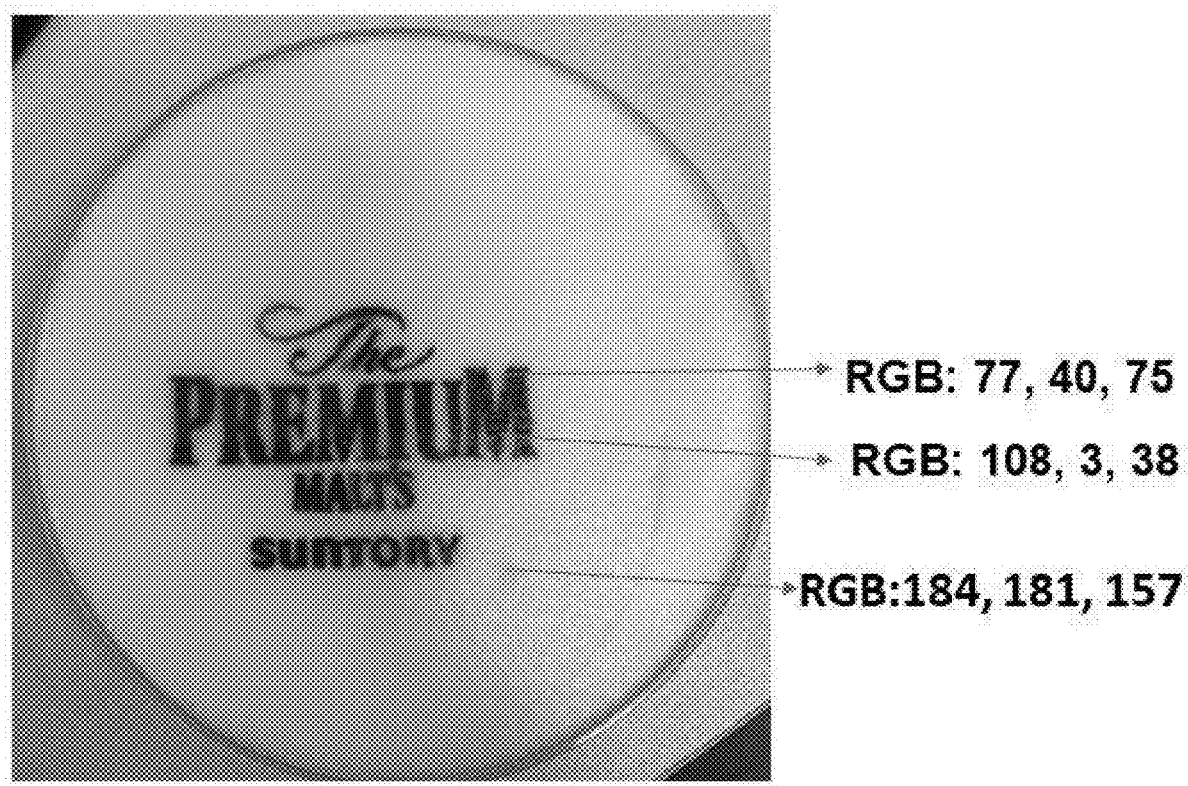
Figure 21A:
FIGS. 21A-21B and 22 are digital images.
Figure 21B:
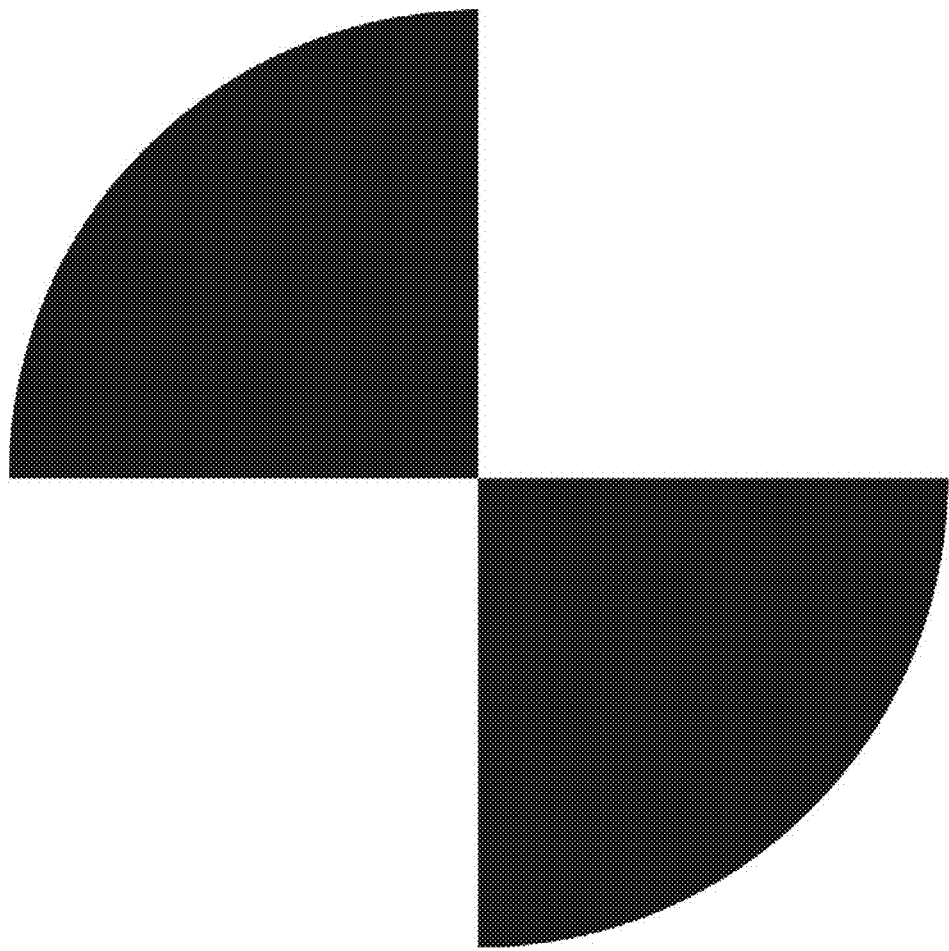

FIG. 20 is a photograph of an ink-image printed on milk foam where the digital images of FIGS. 21A-21B are printed. First digital image of FIG. 21A is printed using the fluid 218 (FORMULATION_A) and then subsequently FIG. 21B is printed using the fluid of FORMULATION_E.

Figure 22:
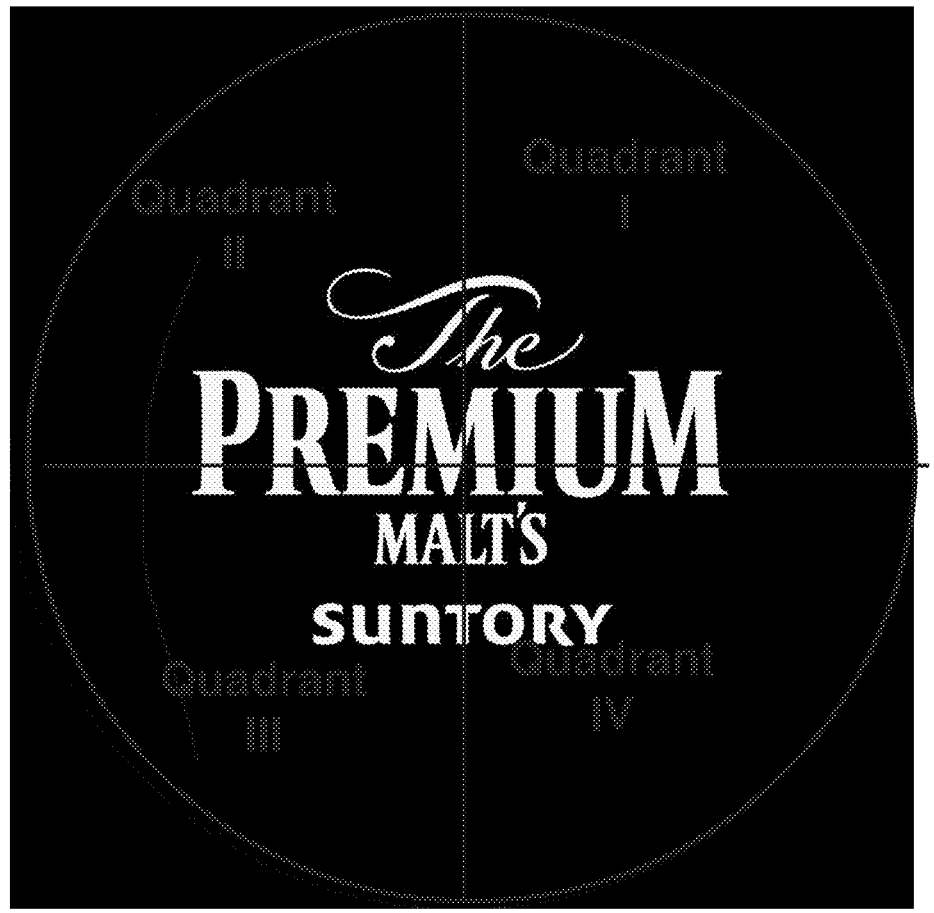

FIG. 22 shows four quadrants.

Note about electronic circuitry 170—'electronic circuitry' or 'circuitry'—any hardware (e.g. digital and/or analog electronics), or software or combinations thereof. In some embodiments, 'circuitry' includes a digital computer. "Analysis circuitry" is electronic circuitry configured to perform a data-analysis function. "Memory" or "storage" (used interchangably) refers to volatile (e.g. RAM) and/or non-volatile (e.g. flash or magnetic medium) computer storage. "Circuitry" or 'memory" may be local to a given device (or locally-coupled devices) or may be non-locally distributed. Although circuitry 170 is shown outside of ink-jet cartridge(s), this is not a limitation and in some embodiments at least some of circuitry 170 resides in any (e.g. ink-jet and/or removable) cartridge.

Examples of target substrate 160, relevant to any teaching or embodiment disclosed herein, include but are not limited to: any food, any foam (e.g. foam of a beverage), any beverage, yogurt, milkshakes, or solid material. For example, the foamed surface is selected from the group consisting of beer foam, egg-whites foam, milk-foam, and milk-substitute foam, soybean foam, aquafaba foam, chickpea foam, nitro foam (meaning a beverage infused with nitrogen, causing a foam mixture of the beverage and nitrogen bubbles), quillaia extract, yucca extract. For example, the target substrate 160 is selected from the group consisting of a cocktail, a beer, a coffee, tea (i.e. chai, matcha), milk shakes, fruit shakes, and vegetable shakes.

Extract of Plant Matter

The term "extract" of plant matter (i.e. unroasted plant matter) refers to fluids that are obtained from the fruit or vegetable flesh or other plant matter—i.e. fluids separated from the fruit or vegetable flesh. These fluids are optionally filtered to remove particles therefrom.

One example of "extract" is juice—i.e. obtained by mechanically separating out fluid from the fruit or vegetable flesh or other plant matter.

In another example, it is possible to soak obtain the fluid from the fruit or vegetable flesh or other plant matter as follows: (i) the fruit or vegetable flesh or other plant matter is soaked in water (e.g. hot water), so that the fluids of the plant matter migrate into the water, which then contains (i.e. is a diluted form of) the "extract" of plant matter.

Extract of plant matter which is diluted or concentrated or filtered is "extract."

Anthocyanin

Wikipedia Writes

Anthocyanins (also anthocyans; from Greek: άνθος (anthos) "flower" and KÚάνεος/KÚανοῦς kyaneos/kyanous "dark blue") are water-soluble vacuolar pigments that, depending on their pH, may appear red, purple, blue or black. Food plants rich in anthocyanins include the blueberry, raspberry, black rice, and black soybean, among many others that are red, blue, purple, or black. Some of the colors of autumn leaves are derived from anthocyanins Thus, anthocyanins is not one particular molecule but rather a is a family of molecules or compounds. Typically, plant matter contains multiple types of anthocyanins (i.e. molecules or compounds).

For the present disclosure, anthocyanin is not limited to one specific anthocyanin molecule but also refers to anthocyanins—i.e. multiple types of anthocyanins.

Betanin

Betanin is a red glycosidic food dye present in beets and in beet juice.

anthocyanins is not one particular molecule but rather a family thereof. Typically, plant matter contains multiple types of anthocyanins (i.e. molecules or compounds).

For the present disclosure, anthocyanin is not limited to one specific anthocyanin molecule but also refers to anthocyanins—i.e. multiple types of anthocyanins.

Primary Colorant of a Fluid, a Mixture of Fluids, an Ink-Dot, Deposited Ingredients of an Ink-Dot, or a Location (or Portion) of an Ink Image Fluids disclosed herein exhibit optical density at least in visible wavelengths, and this optical density fluctuates as a function of wavelength. For any fluid (or mixture of fluids), a 'visible wavelength of the greatest optical density' is the visible wavelength at which the optical density of the fluid (or mixture of fluids) is the greatest.

The concept of "primary colorant" may relate to a fluid or mixture of fluids.

When a given ingredient, or a given combination of ingredients (e.g. red cabbage concentrate or solids thereof or anthocyanins thereof) of a fluid (or a mixture of fluids) is the 'primary colorant' of the fluid (or mixture of fluids), this means that a presence of the given ingredient (or combination of ingredients) in the fluid (or mixture of fluids) contributes at least 51% or at least 55% or at least 60% or at least 75% or at least 80% or at least 85% or at least 90% or at least 95% or at least 97%) of the optical density of the fluid (or mixture of fluids) at the 'visible wavelength of the greatest optical density.'

The concept of "primary colorant," defined above for a fluid or mixture of fluids, is also defined mutatis mutandis for an ink dot residing on a substrate surface, which is essentially a small quantity of fluid, or mixture of fluids.

The concept of "primary colorant," defined above for a fluid or mixture of fluids, is also defined mutatis mutandis for a pixel of a photograph of an ink-image, whose color is provided by a fluid, or a mixture of fluids (ink-jetted fluids).

When (I) a given ingredient, or a given combination of ingredients (e.g. red cabbage concentrate or solids thereof or anthocyanins thereof) of a fluid (or a mixture of fluids) is the 'primary colorant' of the fluid (or mixture of fluids) and (II) a primary-colorant-threshold parameter (which relates to all of fluids, mixtures thereof, ink-dots, and pixel colors of a photograph) is set to PC_THRESHOLD_VALUE (PC_THRESHOLD_VALUE is at least 51 and less than 100) where, this means that a presence of the given ingredient (or combination of ingredients) in the fluid (or mixture of fluids) contributes at least PC_TRESHOLD_VALUE % 51% of the optical density of the fluid (or mixture of fluids) at the 'visible wavelength of the greatest optical density.'

Additional Formulations

Formulation_C (base)—This formulation is referred to elsewhere in this disclosure as "FORMULATION_C."

The ingredients of this formulation are as follows:
(i) 57.6% wt/wt deionized water;
(ii) 40% wt/wt glycerol
(iii) 1.2% wt/wt sodium bicarbonate.

A first mixture is formed from the DI water and the glycerol. Sodium bicarbonate is added to the mixture to raise the pH to about 8.2.

FORMULATION_C has the following properties:
(i) a 25° C. viscosity of about 3-3.5 centipoise (cP);
(ii) a water activity $w_a$ of about 0.84;

Formulation_D (base)—This formulation is referred to elsewhere in this disclosure as "FORMULATION_D."

The ingredients of this formulation are as follows:
(i) 59.98% wt/wt deionized water;
(ii) 40% wt/wt glycerol
(iii) 0.015% wt/wt sodium hydroxide.

A first mixture is formed from the DI water and the glycerol. Sodium hydroxide is added to the mixture to raise the pH to about 11.2.

FORMULATION_D has the following properties:
(i) a 25° C. viscosity of about 2.5-3 centipoise (cP);
(ii) a water activity $w_a$ of about 0.84;

Formulation_E (base)—This formulation is referred to elsewhere in this disclosure as "FORMULATION_E."

The ingredients of this formulation are as follows:
(i) 58.8% wt/wt deionized water;
(ii) 40% wt/wt glycerol
(iii) 0.06% wt/wt ribioflavin phosphate
(iv) 0.015% wt/wt sodium hydroxide.
(v) 0.3% wt/wt ascorbic acid
(vi) 0.64% wt/wt Sodium Bicarbonate F.G 99.5%

A first mixture is formed from all ingredients above except for sodium bicarbonate—a pH of this mixture is 2.82. Sodium biocarbon is subsequently to the mixture to raise the pH to about 8.43.

FORMULATION_E has the following properties:
(i) a 25° C. viscosity of about 3 centipoise (cP);
(ii) a water activity $w_a$ of about 0.84;

Formulation_F (acid)—This formulation is referred to elsewhere in this disclosure as "FORMULATION_F."

The ingredients of this formulation are as follows:
(i) 53% wt/wt deionized water;
(ii) 40% wt/wt glycerol
(iii) 7% wt/wt citric acid A first mixture is formed from the DI water and the glycerol. Citric acid is added to the mixture to reach a pH of 1.78.

FORMULATION_F has the following properties:
(i) a 25° C. viscosity of about 3 centipoise (cP);
(ii) a water activity $w_a$ of about 0.84;

Formulation_G (acid)—This formulation is referred to elsewhere in this disclosure as "FORMULATION_F."

The ingredients of this formulation are as follows:
(i) 40% wt/wt deionized water;
(ii) 40% wt/wt glycerol
(iii) 10% wt/wt ascorbic acid A first mixture is formed from the DI water and the glycerol. Citric acid is added to the mixture to reach a pH of 2.

FORMULATION_G has the following properties:
(i) a 25° C. viscosity of about 4.5 centipoise (cP);
(ii) a water activity $w_a$ of about 0.84;

Measuring Viscosity

As used herein, a viscosity refers to the viscosity at 25° C. Viscosity data for the any formulation disclosed herein may be determined using a Brookfield DV1 viscometer using a cone and plate spindle at 25° C. (±1° C.) at 50 rpm after 30 seconds or 60 rpm after 30 seconds.

Measuring Surface Tension:

The methodology used for measuring surface tension of ink is the Wilhelmy plate Method, The Wilhelmy plate method is a universal method especially suited to check surface tension over time intervals. In short, a vertical plate of known perimeter is attached to a balance, and the force due to wetting is measured. The equipment used and corresponding settings are as follows:

Device: Krüss Tensiometer K20, manufactured by Krüss GmbH. Plate Dimensions: Width: 19.9 nm Thickness: 0.2 mm, Height: 10 mm.

Measurement Settings: immersion depth 2 mm, Surface Detection Sensitivity 0.01 g, Surface Detection Speed 6 min/min, Values 10, Acquisition linear, Max. Measurement Time 60 sec. The liquid to be measured is poured into a clean and dry glass vessel. The sample temperature is controlled at 25° C. The clean and annealed Wilhelmy plate is lowered to the surface of the liquid. The plate is immersed in the fluid to measure and the corresponding value of surface tension is read on the display of the device.

Solids and Percent Solids

For the present document, 'solids' refers to material which is solid at 60 degrees Celsius.

Measuring Light Absorbance

Light absorbance of the solution, is a common measurement technique employed to monitor optical characteristics of samples. The ink samples contain an analyte species dissolved in a solvent at an unknown concentration. The concentration of the analyte in a sample may be determined by using a photometric device to measure the fraction of light absorbed by the sample at a specific wavelength ($\lambda$). The value of $\lambda$ is usually chosen to be near the wavelength of light where the analyte absorbs maximally. According to the Beer-Lambert law. The value of the ink is measured with a photometric apparatus, such as a photometer or spectrophotometer, equipped with a fixed light path sample-retaining device called a cuvette, such as a 1 cm light absorption pathlength cuvette (10 mm cuvette). The sample-retaining device contains a sample comprised of analyte dissolved in a solvent. The value of $I_O$ is ordinarily measured with the same system. (photometric apparatus, sample-retaining device and solvent except that no analyte is present in the solvent. Alternatively, $I_O$ may be measured in the absence of both the sample and the sample-retaining device (this value of $I_O$ is called an "air blank"). When an "air blank" is employed, a separate Ai measurement of the solvent and sample-retaining device gives a "solvent blank" absorbance value. A "corrected absorbance" value related to absorbance of the analyte is then obtained by subtracting the "solvent blank" from each absorbance measurement made on the samples comprised of analyte dissolved in solvent and contained in the sample-retaining device.

Particle Size and Particle Size Distribution

Particle size may be determined according to measurement of particle size distributions. Particle size distribution may be measured using DLS (dynamic light scattering techniques). Dynamic light scattering (DLS), sometimes referred to as Quasi Elastic Light Scattering (QELS), is a non-invasive, well-established technique for measuring the size and size distribution of molecules and particles typically in the submicron region. For example, devices for measuring particle size are available from Malvern Panalytical of Malvern (United Kingdom).

Unless specified otherwise, a particle size distribution (or any related parameter—e.g. the fraction or percentage of particles that have a certain size) refers to measurement by volume.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including the appendices, are hereby incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A printing method comprising:
   a. providing first and second fluids, wherein:
      i. the first fluid is an acidic edible and aqueous ink comprising an extract of plant matter or solids of the extract of the plant matter, a color of both (A) the plant matter or the extract thereof or the solids of the extract therefore and (B) the aqueous ink being pH dependent;
      ii. the second fluid is an edible pH-adjusting liquid which is clear, or whose primary colorant is riboflavin or riboflavin-phosphate; and
   b. in accordance with a relationship between: (i) a pH-color dependency of the first fluid; and (ii) a pH: mixing-ratio dependency of pH upon a mixing ratio between the first and second fluids, ink-jetting droplets of both the first and second fluids to an edible substrate to print a multi-color edible ink-image thereon.

2. The method of claim 1 wherein a primary colorant of the first fluid is the extract of plant matter or solids of the extract of the plant matter.

3. The method of claim 1 wherein a primary colorant of the first fluid is selected from the group consisting of:
   i. anthocyanin-containing extract of anthocyanin-containing plant matter (ACE-ACPM), or solids of the ACE-ACPM;
   ii. Betanin-containing extract of Betanin-containing plant matter, or solids of the ACE-ACPM; and
   iii. combinations thereof.

4. The method of claim 1 wherein the second fluid is clear.

5. The method of claim 1 wherein the pH-adjusting liquid is a base.

6. The method of claim 1 wherein the pH: mixing-ratio dependency of pH upon a mixing ratio between the first and second fluids a customized pH: mixing-ratio dependency, said customized pH: mixing-ratio dependency being customized in accordance with chemical and/or physical properties of the edible substrate or a surface thereof.

7. The method of claim 1 wherein a registration is performed between the ink-jetting of the droplets of the first and second fluids so that droplets of the first fluid are deposited directly onto respective locations where droplets of the second fluid have been previously deposited.

8. The method of claim 1 wherein:
   i. the multi-color edible ink-image comprises first and second sets of ink-dots whose color is respectively a first color and a second color;
   ii. a primary colorant of each ink-dot of the first set is anthocyanin-containing plant matter (ACE-ACPM) or solids of the ACE-ACPM of the first fluid and
   iii. a primary colorant of each ink-dot of the second set is the ACE-ACPM or solids of the ACE-ACPM of the first fluid;
   iv. the first and second colors are different from each other.

9. The method of claim 8 wherein the first color is red or red-violet or violet and the second color is selected from the group consisting of blue-violet, blue, blue-green and green.

10. The method of claim 1 wherein the multi-color edible ink-image produced in step (b) is pH heterogeneous, and wherein a surface of the substrate, on which the ink-image is formed, is pH-homogeneous immediately before a commencing of the ink-jetting of step (b).

11. The method of claim 1, performed to print a digital image, wherein a multi-color directive for printing the digital image is computed or received, and the ink-jetting of the droplets is performed in accordance with a relationship between: (i) the multi-color directive; (ii) a pH-color dependency of the first fluid; and (iii) a pH: mixing-ratio dependency of pH upon a mixing ratio between the first and second fluids, depositing droplets of both the first and second fluids to an edible substrate to print a multi-color edible ink-image thereon.

12. The method of claim 1 wherein the edible substrate is a foamed beverage.

13. The method of claim 1 wherein both of the first and the second fluid lacks artificial colorants other than riboflavin or riboflavin-phosphate, or comprises at most 250 ppm or at most 150 ppm or at most 100 ppm or at most 50 ppm or at most 25 ppm or at most 15 ppm or at most 10 ppm or at most 5 ppm artificial colorants other than riboflavin or riboflavin phosphate.

14. A system for ink-jet printing, the system comprising:
   a. an ink-jet printer defining a target-location;
   b. first and second reservoirs of fluids respectively loaded with first and second fluids, wherein:
      i. the first fluid is an acidic, edible and aqueous ink comprising an extract of plant matter or solids of the extract of the plant matter, a color of both (A) the plant matter or the extract thereof or the solids of the extract thereof and (B) the aqueous ink being pH dependent;
      ii. the second fluid is an edible pH-adjusting liquid which is clear, or whose primary colorant is riboflavin or riboflavin-phosphate; and
   c. control circuitry for controlling deposition of droplets to print a multi-color edible in image onto a substrate disposed at the target-location by ink-jetting thereon droplets of both the first and second fluids, wherein the ink-ejetting of the droplets of the first and second fluids is controlled in accordance with a combination of: (i) a pH-color dependency of the first fluid; and (ii) a pH: mixing-ratio dependency of pH upon a mixing ratio between the first and second fluids.

15. An article of manufacture comprising:
   a. an edible substrate;

b. a pH-heterogeneous edible ink-image disposed on an upper surface of the edible substrate, the ink-image comprising a first and second set of ink-dots, wherein:
  i. for each given ink-dot of both the first and second sets of ink-dots, a primary colorant thereof is an extract of plant matter or solids of the extract of the plant matter, wherein a color of the extract of plant matter or solids of the extract of the plant matter is pH sensitive;
  ii. for each given ink-dot of the first sets of ink-dots, a pH thereof is within 0.5 or within 1 or within 1.5 of a common first pH value and a color thereof is a first dot-color;
  iii. for each given ink-dot of the second sets of ink-dots, a pH thereof is within 0.5 or within 1 or within 1.5 of a common second pH value and a color thereof is a second dot-color;
  iv. an absolute value of a difference between the first and second pH values is at least 1.5 or at least 2 or at least 2.5 or at least 3 or at least 4; and
  v. at least one of a first dot-color-condition, a second dot-color-condition, a third dot-color-condition, and a fourth dot-color-condition is true, the dot-color conditions being defined as follows:
    A. according to the first dot-color-condition, the first dot-color is red and the second dot-color is selected from the group consisting of blue-violet, blue, blue-green and green;
    B. according to the second dot-color-condition, the first dot-color is red and the second dot-color is selected from the group consisting of blue, blue-green and green;
    C. according to the third dot-color-condition, the first dot-color is red-violet or violet and the second dot-color is selected from the group consisting blue, blue-green and green; and
    D. according to the fourth dot-color-condition, the first dot-color is red-violet or violet and the second dot-color is selected from the group consisting blue, and green.

16. The article of claim 15 wherein the edible surface is a foamed beverage and the edible ink-image disposed on an upper surface of the foamed beverage.

17. The article of claim 15 wherein each given dot of the first and second set of ink-dots comprises anthocyanin-containing extract of anthocyanin-containing plant matter (ACE-ACPM), or solids of the ACE-ACPM.

18. The article of claim 15, where each ink-dot of the first ink-dots has a diameter of at most 100 microns.

19. The method of claim 1 wherein for a plurality of given locations of the multi-color ink image, relative numbers and/or sizes of droplets of the first and second fluids that are ink-jetted to each said given location of the multi-color edible image is/are determined in accordance with the relation between the pH-color dependency and the pH: mixing-ratio dependency.

20. The method of claim 1 wherein for a plurality of given locations of the multi-color ink image, relative numbers and/or sizes of droplets of the first and second fluids that are ink-jetted to each said given location of the multi-color edible image is/are determined in accordance with the relation between the pH-color dependency and the pH: mixing-ratio dependency, so as to target respective colors to appear at each of the given locations of the multi-color ink image.

* * * * *